US012231628B2

(12) United States Patent
Xu et al.

(10) Patent No.: US 12,231,628 B2
(45) Date of Patent: *Feb. 18, 2025

(54) PICTURE PREDICTION METHOD AND APPARATUS

(71) Applicant: Huawei Technologies Co., Ltd., Shenzhen (CN)

(72) Inventors: Weiwei Xu, Hangzhou (CN); Haitao Yang, Shenzhen (CN); Yin Zhao, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/168,799

(22) Filed: Feb. 14, 2023

(65) Prior Publication Data
US 2023/0188711 A1 Jun. 15, 2023

Related U.S. Application Data

(63) Continuation of application No. 17/240,508, filed on Apr. 26, 2021, which is a continuation of application No. PCT/CN2019/113541, filed on Oct. 28, 2019.

(30) Foreign Application Priority Data

Oct. 27, 2018 (CN) .......................... 201811262934.7

(51) Int. Cl.
H04N 19/11 (2014.01)
H04N 19/132 (2014.01)
(Continued)

(52) U.S. Cl.
CPC ........... *H04N 19/11* (2014.11); *H04N 19/132* (2014.11); *H04N 19/137* (2014.11);
(Continued)

(58) Field of Classification Search
None
See application file for complete search history.

(56) References Cited

U.S. PATENT DOCUMENTS 6,577,310 B1    6/2003  Kim et al.
9,609,343 B1 *  3/2017  Chen ...................... H04N 19/11
(Continued)

FOREIGN PATENT DOCUMENTS

CN    101415121 A    4/2009
CN    102685474 A    9/2012
(Continued)

OTHER PUBLICATIONS

Man-Shu Chiang, et al., "CE10.1: Combined and multi-hypothesis prediction," Joint Video Experts Team (JVET) of ITU-T SG 16 WP 3 and ISO/IEC JTC 1/SC 29/WG 11, JVET-K0257-v1, 11th Meeting: Ljubljana, SI, Jul. 10-18, 2018, 7 pages.
(Continued)

*Primary Examiner* — Reza Aghevli
(74) *Attorney, Agent, or Firm* — Conley Rose, P.C.

(57) ABSTRACT

A picture prediction method includes receiving a bitstream; parsing the bitstream to obtain a prediction mode of a current block; when the prediction mode of the current block is a combined intra and inter prediction mode, selecting an execution manner of a triangular prediction unit mode according to a preset policy; determining motion information of the current block according to the execution manner of the triangular prediction unit mode; performing a motion compensation process based on the motion information, to obtain an inter prediction sample; obtaining an intra prediction sample according to the prediction mode of the current block; and combining the inter prediction sample and the intra prediction sample to obtain a prediction picture of the current block.

21 Claims, 12 Drawing Sheets

(51) Int. Cl.
  *H04N 19/137* (2014.01)
  *H04N 19/159* (2014.01)
  *H04N 19/176* (2014.01)
  *H04N 19/513* (2014.01)
  *H04N 19/70* (2014.01)

(52) U.S. Cl.
  CPC ......... *H04N 19/159* (2014.11); *H04N 19/176* (2014.11); *H04N 19/513* (2014.11); *H04N 19/70* (2014.11)

(56) References Cited

U.S. PATENT DOCUMENTS

| | | | |
|---|---|---|---|
| 10,009,622 B1* | 6/2018 | Mukherjee | H04N 19/59 |
| 11,711,511 B2* | 7/2023 | Xu | H04N 19/119 |
| | | | 375/240.02 |
| 2009/0232217 A1 | 9/2009 | Lee et al. | |
| 2010/0195715 A1 | 8/2010 | Liu et al. | |
| 2011/0142132 A1 | 6/2011 | Tourapis et al. | |
| 2014/0185664 A1* | 7/2014 | Van Der Auwera | H04N 19/33 |
| | | | 375/240.02 |
| 2014/0314147 A1* | 10/2014 | Rusanovskyy | H04N 19/503 |
| | | | 375/240.12 |
| 2015/0016501 A1* | 1/2015 | Guo | H04N 1/644 |
| | | | 375/240.02 |
| 2015/0030073 A1* | 1/2015 | Chen | H04N 19/51 |
| | | | 375/240.16 |
| 2015/0103921 A1* | 4/2015 | Hannuksela | H04N 19/152 |
| | | | 375/240.26 |
| 2015/0195573 A1* | 7/2015 | Aflaki Beni | H04N 19/513 |
| | | | 375/240.16 |
| 2015/0312580 A1* | 10/2015 | Hannuksela | G06F 9/268 |
| | | | 375/240.02 |
| 2015/0312588 A1* | 10/2015 | Yamamoto | H04N 19/577 |
| | | | 375/240.15 |
| 2016/0165263 A1* | 6/2016 | Zhang | H04N 19/70 |
| | | | 375/240.12 |
| 2016/0173873 A1 | 6/2016 | Oh et al. | |
| 2016/0191931 A1* | 6/2016 | Hannuksela | H04N 19/136 |
| | | | 375/240.12 |
| 2016/0277761 A1* | 9/2016 | Li | H04N 19/126 |
| 2017/0054976 A1* | 2/2017 | Li | H04N 19/14 |
| 2017/0070748 A1* | 3/2017 | Li | H04N 19/176 |
| 2017/0078703 A1* | 3/2017 | Ridge | H04N 19/184 |
| 2017/0094288 A1* | 3/2017 | Hannuksela | H04N 19/187 |
| 2018/0103268 A1* | 4/2018 | Huang | H04N 19/91 |
| 2018/0139469 A1* | 5/2018 | Lainema | H04N 19/105 |
| 2018/0176587 A1* | 6/2018 | Panusopone | H04N 19/176 |
| 2018/0249156 A1 | 8/2018 | Heo et al. | |
| 2018/0376126 A1* | 12/2018 | Hannuksela | H04N 19/59 |
| 2019/0082184 A1* | 3/2019 | Hannuksela | H04N 13/15 |
| 2019/0141334 A1 | 5/2019 | Lim et al. | |
| 2019/0182504 A1* | 6/2019 | Lainema | H04N 19/56 |
| 2019/0230350 A1* | 7/2019 | Chen | H04N 19/105 |
| 2019/0268599 A1* | 8/2019 | Hannuksela | G03B 37/00 |
| 2019/0297339 A1* | 9/2019 | Hannuksela | H04N 19/105 |
| 2019/0364284 A1* | 11/2019 | Moon | H04N 19/513 |
| 2020/0120334 A1 | 4/2020 | Xu et al. | |
| 2020/0236356 A1* | 7/2020 | Bordes | H04N 19/157 |
| 2020/0236390 A1* | 7/2020 | Galpin | H04N 19/463 |
| 2020/0244966 A1* | 7/2020 | Yoo | H04N 19/122 |
| 2020/0260063 A1* | 8/2020 | Hannuksela | H04N 21/234345 |
| 2020/0288171 A1* | 9/2020 | Hannuksela | H04N 19/124 |
| 2020/0322610 A1* | 10/2020 | Leleannec | H04N 19/96 |
| 2020/0374528 A1 | 11/2020 | Huang et al. | |
| 2021/0120235 A1 | 4/2021 | Liao et al. | |
| 2021/0227209 A1 | 7/2021 | Liu et al. | |
| 2021/0250581 A1 | 8/2021 | Xu et al. | |

FOREIGN PATENT DOCUMENTS

| | | |
|---|---|---|
| CN | 108282658 A | 7/2018 |
| EP | 3217663 A1 | 9/2017 |
| JP | H09261654 A | 10/1997 |
| WO | 2017043816 A1 | 3/2017 |
| WO | 2017204532 A1 | 11/2017 |
| WO | 2018128466 A1 | 7/2018 |
| WO | 2020009086 A1 | 1/2020 |
| WO | 2020242883 A1 | 12/2020 |

OTHER PUBLICATIONS

Ru-Ling Liao et al "CE10.3.1.b: Triangular prediction unit mode," Joint Video Exploration Team (JVET) of ITU-T SG16 WP 3 and ISO/IEC JTC 1/SC 29/WG 11, JVET-L0124-v2, 12th Meeting: Macao, CN, Oct. 3-12, 2018, 9 pages.

Martin Winken, et al., CE10: Multi-Hypothesis Inter Prediction (Tests 1.2.a-1.2.c), Joint Video Experts Team (JVET) of ITU-T SG 16 WP 3 and ISO/IEC JTC 1/SC 29/WG 11, JVET-L0148-v3, 12th Meeting: Macao, CN, Oct. 3-12, 2018, 13 pages.

JVET-J1000, Gary Sullivan, et al, "Meeting Report of the 10th meeting of the Joint Video Experts Team (JVET), San Diego, US, Apr. 10-20, 2018," Joint Video Experts Team (JVET) of ITU-T SG 16 WP 3 and ISO/IECJTC 1/SC 29/WGII 10th Meeting: San Diego, US, XP030196328, Apr. 10-20, 2018, 125 pages.

Joceli Mayer, et al, "Region Based Image Compression using Recursive Triangular Partitioning with a Blending Model," 1998, IEEE, 5 pages. XP032136032.

JVET-M0883, Hongtao Wang, et al, "CE10-related: Using regular merge index signaling for triangle mode," Joint Video Experts Team (JVET) of ITU-T SG 16 WP 3 and ISO/IECJTC 1/SC 29/WG11, 13th Meeting: Marrakech, MA, Jan. 9, 2019, total 3 pages. XP030215315.

JVET-L0100-v3, Chiang, M., et al, "CE10.1.1: Multi-hypothesis prediction for improving AMVP mode, skip or merge mode, and intra mode," Joint Video Experts Team (JVET) of ITU-T SG 16 WP 3 and ISO/IEC JTC 1/SC 29/WG 11, 12th Meeting: Macao, CN, Oct. 3-12, 2018, 14 pages.

JVET-K1001-v7, Bross, B., et al, "Versatile Video Coding (Draft 2)," Joint Video Experts Team (JVET) of ITU-T SG 16 WP 3 and ISO/IEC JTC 1/SC 29/WG 11, 11th Meeting: Ljubljana, SI, Jul. 10-18, 2018, 148 pages.

JVET-L0375-v1, Xu, W., et al, "CE10-related: inter prediction sample filtering," Joint Video Experts Team (JVET) of ITU-T SG 16 WP 3 and ISO/IEC JTC 1/SC 29/WG 11, 12th Meeting: Macao, CN, Oct. 3-12, 2018, 4 pages.

ITU-T H.265, "Series H: Audiovisual and Multimedia Systems Infrastructure of audiovisual services—Coding of moving video, High efficiency video coding," Feb. 2018, 692 pages.

Document: JVET-K0248-v1, Yu-Chi Su et al, CE4.4.1: Generalized bi-prediction for inter coding, Joint Video Experts Team (JVET) of ITU-T SG 16 WP 3 and ISO/IEC JTC 1/SC 29/WG 11, 11th Meeting: Ljubljana, SI, Jul. 10-18, 2018, 4 pages.

* cited by examiner

PICTURE PREDICTION METHOD AND APPARATUS

CROSS-REFERENCE TO RELATED APPLICATIONS

This is a continuation of U.S. patent application Ser. No. 17/240,508 filed on Apr. 26, 2021, which is a continuation of International Patent Application No. PCT/CN2019/113541 filed on Oct. 28, 2019, which claims priority to Chinese Patent Application No. 201811262934.7 filed on Oct. 27, 2018. All of the aforementioned patent applications are hereby incorporated by reference in their entireties.

TECHNICAL FIELD

This application relates to the field of video encoding and decoding, and in particular, to a picture prediction method and apparatus.

BACKGROUND

As internet technologies rapidly develop and people's material and spiritual cultures are increasingly enriched, there are increasing demands on the internet for applications of videos, especially for applications of high-definition videos. However, a high-definition video has a quite large amount of data. To transmit the high-definition video on the internet with a limited bandwidth, problems of video encoding and decoding need to be first resolved. Video encoding and decoding are used in a wide range of digital video applications, for example, broadcast digital television (TV), video transmission over the internet and mobile networks, real-time conversational applications such as video chat and video conferencing, digital video discs (DVDs) and BLU-RAY discs, and security applications of video content collection and editing systems and camcorders.

Each picture in a video sequence is usually partitioned into a set of non-overlapping blocks, and coding is usually performed at a block level. For example, a prediction block is generated through spatial (intra-picture) prediction and temporal (inter-picture) prediction. Correspondingly, prediction modes may include an intra prediction mode (spatial prediction) and an inter prediction mode (temporal prediction). An intra prediction mode set may include 35 different intra prediction modes, for example, non-directional modes such as a DC (or mean) mode and a planar mode, or directional modes such as those defined in H.265, or may include 67 different intra prediction modes, for example, non-directional modes such as a DC (or mean) mode and a planar mode, or directional modes such as those defined in H.266 under development. An inter prediction mode set depends on an available reference picture and other inter prediction parameters, for example, depends on whether the entire reference picture is used or only a part of the reference picture is used.

In the conventional technology, picture prediction efficiency is relatively low.

SUMMARY

Embodiments of this application (or this disclosure) provide a picture prediction apparatus and method.

According to a first aspect, an embodiment of the present disclosure provides a picture prediction method. The method includes receiving a bitstream; parsing the bitstream to obtain a prediction mode of a current block, when the prediction mode of the current block is a combined intra and inter prediction mode, selecting an execution manner of a triangular prediction unit mode according to a preset policy, determining motion information of the current block according to the execution manner of the triangular prediction unit mode, performing a motion compensation process based on the motion information, to obtain an inter prediction sample, obtaining an intra prediction sample according to the prediction mode of the current block, and combining the inter prediction sample and the intra prediction sample to obtain a prediction picture of the current block.

According to the method in the first aspect of the embodiments of the present disclosure, encoding and decoding efficiency can be improved.

According to a second aspect, an embodiment of the present disclosure provides a picture prediction method. The method includes receiving a bitstream; parsing the bitstream to obtain a triangular prediction unit mode of a current block, when the triangular prediction unit mode is used for the current block, selecting an execution manner of a combined intra and inter prediction mode according to a first preset policy, obtaining motion information of the current block according to the triangular prediction unit mode, to obtain an inter prediction sample, and obtaining a prediction picture of the current block according to the execution manner of the combined intra and inter prediction mode and the inter prediction sample.

According to the method in the second aspect of the embodiments of the present disclosure, encoding and decoding efficiency can be improved.

According to a third aspect, an embodiment of the present disclosure provides an apparatus for decoding a video stream, including a processor and a memory. The memory stores instructions, and the instructions enable the processor to perform the method in the first aspect.

According to a fourth aspect, an embodiment of the present disclosure provides an apparatus for decoding a video stream, including a processor and a memory. The memory stores instructions, and the instructions enable the processor to perform the method in the second aspect.

According to a fifth aspect, a computer-readable storage medium is provided. The computer-readable storage medium stores instructions, and when the instructions are executed, one or more processors are enabled to encode or decode video data. The instructions enable the one or more processors to perform the method in any possible implementation of the first aspect.

According to a sixth aspect, an embodiment of the present disclosure provides a computer program including program code. When the program code is run on a computer, the method in any possible implementation of the first aspect is performed.

According to a seventh aspect, a computer-readable storage medium is provided. The computer-readable storage medium stores instructions, and when the instructions are executed, one or more processors are enabled to encode or decode video data. The instructions enable the one or more processors to perform the method in any possible implementation of the second aspect.

According to an eighth aspect, an embodiment of the present disclosure provides a computer program including program code. When the program code is run on a computer, the method in any possible implementation of the second aspect is performed.

Details of one or more embodiments are described in accompanying drawings and the following descriptions.

Other features, objects, and advantages are apparent from the specification, drawings, and claims.

BRIEF DESCRIPTION OF DRAWINGS

To describe technical solutions in some of the embodiments of this application more clearly, the following describes the accompanying drawings of the embodiments of this application.

Figure 1A:
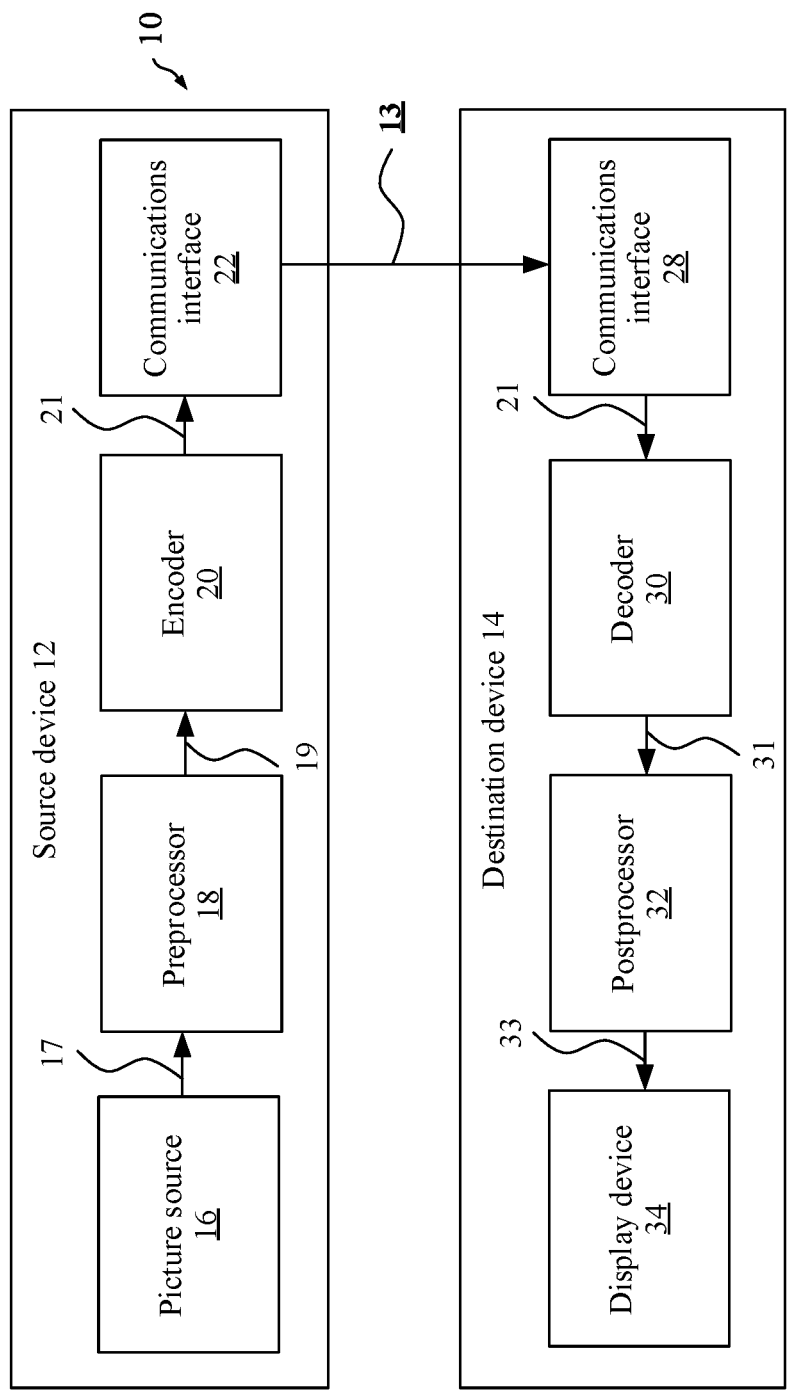
FIG. 1A is a block diagram illustrating an example of a video encoding system for implementing an embodiment of the present disclosure.

In the following, identical reference signs represent identical or at least functionally equivalent features unless otherwise specified.

DESCRIPTION OF EMBODIMENTS

Video coding is usually processing a sequence of pictures that form a video or a video sequence. In the field of video coding, the terms "picture", "frame", and "image" may be used as synonyms. Video coding used in this application (or this disclosure) indicates video encoding or video decoding. Video encoding is performed on a source side, and usually includes processing (for example, through compression) an original video picture to reduce an amount of data required for representing the video picture (for more efficient storage and/or transmission). Video decoding is performed on a destination side, and usually includes inverse processing relative to an encoder to reconstruct a video picture. "Coding" of a video picture in the embodiments should be understood as "encoding" or "decoding" related to a video sequence. A combination of encoding and decoding is also referred to as coding (encoding and decoding).

Each picture in a video sequence is usually partitioned into a set of non-overlapping blocks, and coding is usually performed at a block level. To be specific, on an encoder side, a video is usually processed, that is, encoded, at a block (or a picture block or a video block) level. For example, a prediction block is generated through spatial (intra-picture) prediction and temporal (inter-picture) prediction, the prediction block is subtracted from a current block (a block that is being processed or to be processed) to obtain a residual block, and the residual block is transformed in transform domain and quantized to reduce an amount of data that is to be transmitted (compressed). On a decoder side, inverse processing relative to the encoder is applied to the encoded or compressed block to reconstruct the current block for representation. In addition, the encoder duplicates a processing loop of the decoder, so that the encoder and the decoder generate same prediction (for example, intra prediction and inter prediction) and/or reconstruction for processing, that is, encoding a subsequent block.

The term "block" may be a part of a picture or a frame. Key terms in this application are defined as follows:

Current block: The current block is a block that is being processed. For example, during encoding, the current block is a block that is being encoded, and during decoding, the current block is a block that is being decoded. If the block that is being processed is a chroma component block, the block is referred to as a current chroma block. A luma block corresponding to the current chroma block may be referred to as a current luma block.

Reference block: The reference block is a block that provides a reference signal for a current block. In a search process, a plurality of reference blocks may be traversed to find an optimal reference block.

Prediction block: A block that provides prediction for a current block is referred to as a prediction block. For example, after a plurality of reference blocks are traversed, an optimal reference block is found. The optimal reference block provides prediction for the current block, and the block is referred to as a prediction block.

Picture block signal: The picture block signal is a pixel value, a sample value, or a sample signal in a picture block.

Prediction signal: A pixel value, a sample value, or a sample signal in a prediction block is referred to as a prediction signal.

The following describes embodiments of an encoder 20, a decoder 30, and an encoding system 10 based on FIG. 1A and FIG. 1B to FIG. 3.

FIG. 1A is a conceptual or schematic block diagram illustrating an example encoding system 10, for example, a video encoding system 10 that may use the technologies of this application (this disclosure). An encoder 20 (for example, a video encoder 20) and a decoder 30 (for example, a video decoder 30) in the video encoding system 10 represent device examples that may be configured to perform intra prediction according to various examples described in this application. As shown in FIG. 1A, the encoding system 10 includes a source device 12 configured to provide encoded data 13 such as an encoded picture 13 to a destination device 14 for decoding the encoded data 13, or the like.

The source device 12 includes the encoder 20, and additionally or optionally, may include a picture source 16, for example, a preprocessing unit 18 such as a picture preprocessing unit 18, and a communications interface or communications unit 22.

The picture source 16 may include or may be any type of picture capturing device configured to capture a real-world picture and the like, and/or any type of device for generating a picture or comment (for screen content encoding, some text on a screen is also considered as a part of a to-be-encoded picture), for example, a computer graphics processing unit (GPU) configured to generate a computer animation picture, or any type of device configured to obtain and/or provide a real-world picture or a computer animation picture (for example, screen content or a virtual reality (VR) picture), and/or any combination thereof (for example, an augmented reality (AR) picture).

A picture may be considered as a two-dimensional array or matrix of samples with luma values. The sample in the array may also be referred to as a pixel (a short form of a picture element) or a pel. A quantity of samples in horizontal and vertical directions (or axes) of the array or the picture defines a size and/or a resolution of the picture. For representation of color, three color components are usually used, that is, the picture may be represented as or include three sample arrays. In red, green, and blue (RBG) format or color space, a picture includes corresponding red, green, and blue sample arrays. However, in video coding, each pixel is usually represented in a luminance/chrominance format or color space, for example, a picture in YCbCr format includes a luminance component indicated by Y (sometimes indicated by L) and two chrominance components indicated by Cb and Cr. The luminance (luma) component Y indicates luminance or gray level intensity (for example, the two are the same in a gray-scale picture), and the two chrominance (chroma) components Cb and Cr represent chrominance or color information components. Accordingly, the picture in YCbCr format includes a luminance sample array of luminance sample values (Y), and two chrominance sample arrays of chrominance values (Cb and Cr). A picture in RGB format may be converted or transformed into a picture in YCbCr format, and vice versa. This process is also referred to as color transform or conversion. If a picture is monochrome, the picture may include only a luminance sample array.

The picture source 16 (for example, a video source 16) may be, for example, a camera configured to capture a picture, for example, a memory such as a picture memory, which includes or stores a previously captured or generated picture, and/or any type of (internal or external) interface for obtaining or receiving a picture. The camera may be, for example, a local camera or an integrated camera integrated into the source device, and the memory may be a local memory or an integrated memory integrated into the source device. The interface may be, for example, an external interface for receiving a picture from an external video source. The external video source is, for example, an external picture capturing device such as a camera, an external memory, or an external picture generation device. The external picture generation device is, for example, an external computer GPU, a computer, or a server. The interface may be any type of interface according to any proprietary or standardized interface protocol, for example, a wired or wireless interface or an optical interface. The interface for obtaining picture data 17 may be an interface the same as the communications interface 22, or may be a part of the communications interface 22.

Different from the preprocessing unit 18 and processing performed by the preprocessing unit 18, the picture 17 or the picture data 17 (for example, video data 16) may also be referred to as an original picture 17 or original picture data 17.

The preprocessing unit 18 is configured to receive the (original) picture data 17 and perform preprocessing on the picture data 17, to obtain a preprocessed picture 19 or preprocessed picture data 19. For example, the preprocessing performed by the preprocessing unit 18 may include trimming, color format conversion (for example, from RGB to YCbCr), color correction, or noise reduction. It may be understood that the preprocessing unit 18 may be an optional component.

The encoder 20 (for example, the video encoder 20) is configured to receive the preprocessed picture data 19 and provide encoded picture data 21 (details are further described below, for example, based on FIG. 2 or FIG. 4). In an example, the encoder 20 may be configured to perform the following embodiments 1 to 5.

The communications interface 22 of the source device 12 may be configured to receive the encoded picture data 21 and transmit the encoded picture data 21 to another device, for example, the destination device 14 or any another device, for storage or direct reconstruction, or may be configured to process the encoded picture data 21 before correspondingly storing the encoded data 13 and/or transmitting the encoded data 13 to another device. The other device is, for example, the destination device 14 or any other device used for decoding or storage.

The destination device 14 includes the decoder 30 (for example, the video decoder 30), and additionally or optionally, may include a communications interface or communications unit 28, a postprocessing unit 32, and a display device 34.

For example, the communications interface 28 of the destination device 14 is configured to directly receive the encoded picture data 21 or the encoded data 13 from the source device 12 or any other source. The any other source is, for example, a storage device, and the storage device is, for example, an encoded picture data storage device.

The communications interface 22 and the communications interface 28 may be configured to transmit or receive the encoded picture data 21 or the encoded data 13 over a direct communications link between the source device 12 and the destination device 14 or over any type of network. The direct communications link is, for example, a direct wired or wireless connection, and the any type of network is, for example, a wired or wireless network or any combination thereof, or any type of private network or public network or any combination thereof.

The communications interface 22 may be, for example, configured to encapsulate the encoded picture data 21 into a proper format such as a packet for transmission over a communications link or a communications network.

The communications interface 28 as a corresponding part of the communications interface 22 may be configured to decapsulate the encoded data 13 to obtain the encoded picture data 21, and the like.

Both the communications interface 22 and the communications interface 28 may be configured as unidirectional communications interfaces, for example, an arrow pointing from the source device 12 to the destination device 14 that are used for the encoded picture data 13 in FIG. 1A, or may be configured as bidirectional communications interfaces, and may be, for example, configured to send and receive a message to establish a connection, and confirm and exchange any other information related to a communications link and/or data transmission such as encoded picture data transmission.

The decoder 30 is configured to receive the encoded picture data 21 and provide decoded picture data 31 or a decoded picture 31 (details are further described below, for example, based on FIG. 3 or FIG. 5). In an example, the decoder 30 may be configured to perform the following embodiments 1 to 7.

The postprocessing unit 32 of the destination device 14 is configured to postprocess the decoded picture data 31 (also referred to as reconstructed picture data) such as the decoded picture 31, to obtain postprocessed picture data 33 such as a postprocessed picture 33. The postprocessing performed by the postprocessing unit 32 may include, for example, color format conversion (for example, from YCbCr to RGB), color correction, trimming, resampling, or any other processing to prepare the decoded picture data 31 for display by the display device 34.

The display device 34 of the destination device 14 is configured to receive the postprocessed picture data 33 to display the picture to a user, a viewer, or the like. The display device 34 may be or may include any type of display configured to present a reconstructed picture, for example, an integrated or external display or monitor. For example, the display may include a liquid-crystal display (LCD), an organic light-emitting diode (OLED) display, a plasma display, a projector, a micro-LED display, a liquid crystal on silicon (LCoS) display, a digital light processor (DLP), or any other type of display.

Although FIG. 1A depicts the source device 12 and the destination device 14 as separate devices, device embodiments may also include both the source device 12 and the destination device 14 or both a function of the source device 12 and a function of the destination device 14, that is, the source device 12 or the corresponding function and the destination device 14 or the corresponding function. In such embodiments, the source device 12 or the corresponding function and the destination device 14 or the corresponding function may be implemented by using same hardware and/or software, separate hardware and/or software, or any combination thereof.

Based on the descriptions, a person skilled in the art easily understands that existence and (accurate) division of functions of different units or functions/a function of the source device 12 and/or the destination device 14 shown in FIG. 1A may vary with an actual device and application.

The encoder 20 (for example, the video encoder 20) and the decoder 30 (for example, the video decoder 30) each may be implemented as any one of various proper circuits, for example, one or more microprocessors, a digital signal processor (DSP), an application-specific integrated circuit (ASIC), a field-programmable gate array (FPGA), discrete logic, hardware, or any combination thereof. If the technology is partially implemented in software, the device may store software instructions in a proper non-transitory computer-readable storage medium, and may execute the instructions in hardware by using one or more processors to perform the technologies in this disclosure. Any of the foregoing content (including hardware, software, a combination of hardware and software, and the like) may be considered as one or more processors. The video encoder 20 and the video decoder 30 each may be included in one or more encoders or decoders, and any one of the encoders or the decoders may be integrated as a part of a combined encoder/decoder (a codec) in a corresponding device.

The source device 12 may be referred to as a video encoding device or a video encoding apparatus. The destination device 14 may be referred to as a video decoding device or a video decoding apparatus. The source device 12 and the destination device 14 each may be an example of a video encoding device or a video decoding apparatus.

The source device 12 and the destination device 14 each may include any one of various devices, including any type of handheld or stationary device, for example, a notebook or laptop computer, a mobile phone, a smartphone, a tablet or a tablet computer, a video camera, a desktop computer, a set-top box, a television, a display device, a digital media player, a video game console, a video streaming transmission device (such as a content service server or a content delivery server), a broadcast receiver device, or a broadcast transmitter device, and may use or may not use any type of operating system.

In some cases, the source device 12 and the destination device 14 may be equipped for wireless communication. Therefore, the source device 12 and the destination device 14 may be wireless communications devices.

In some cases, the video encoding system 10 shown in FIG. 1A is merely an example, and the technologies in this application may be applied to a video coding setting (for example, video encoding or video decoding) that does not need to include any data communication between an encoding device and a decoding device. In other examples, data may be retrieved from a local memory, streamed over a network, or the like. A video encoding device may encode data and store the data in a memory, and/or a video decoding device may retrieve the data from the memory and decode the data. In some examples, encoding and decoding are performed by devices that do not communicate with each other but only encode data to a memory and/or retrieve the data from the memory and decode the data.

It should be understood that, for each of the foregoing examples described with reference to the video encoder 20, the video decoder 30 may be configured to perform an inverse process. For a signaling syntax element, the video decoder 30 may be configured to receive and parse the syntax element and decode related video data accordingly. In some examples, the video encoder 20 may entropy-encode a syntax element into an encoded video bitstream. In such examples, the video decoder 30 may parse the syntax element and decode related video data accordingly.

Figure 1B:
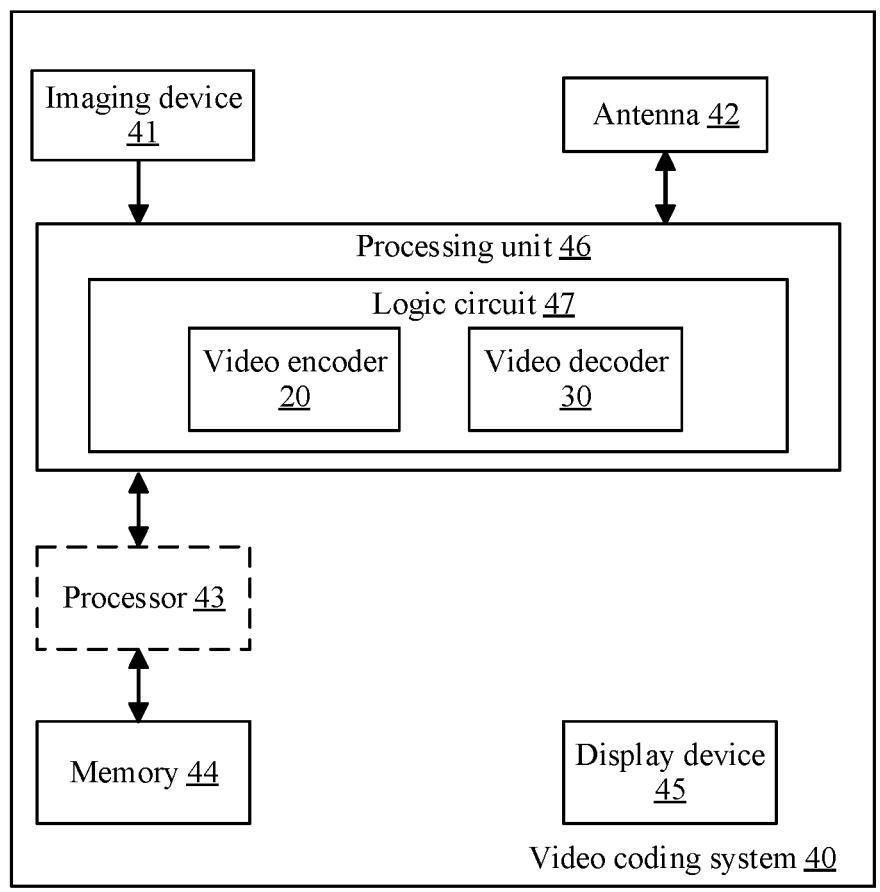
FIG. 1B is a block diagram illustrating an example of a video coding system including any one or two of the encoder in FIG. 2 and the decoder in FIG. 3.
Figure 2:
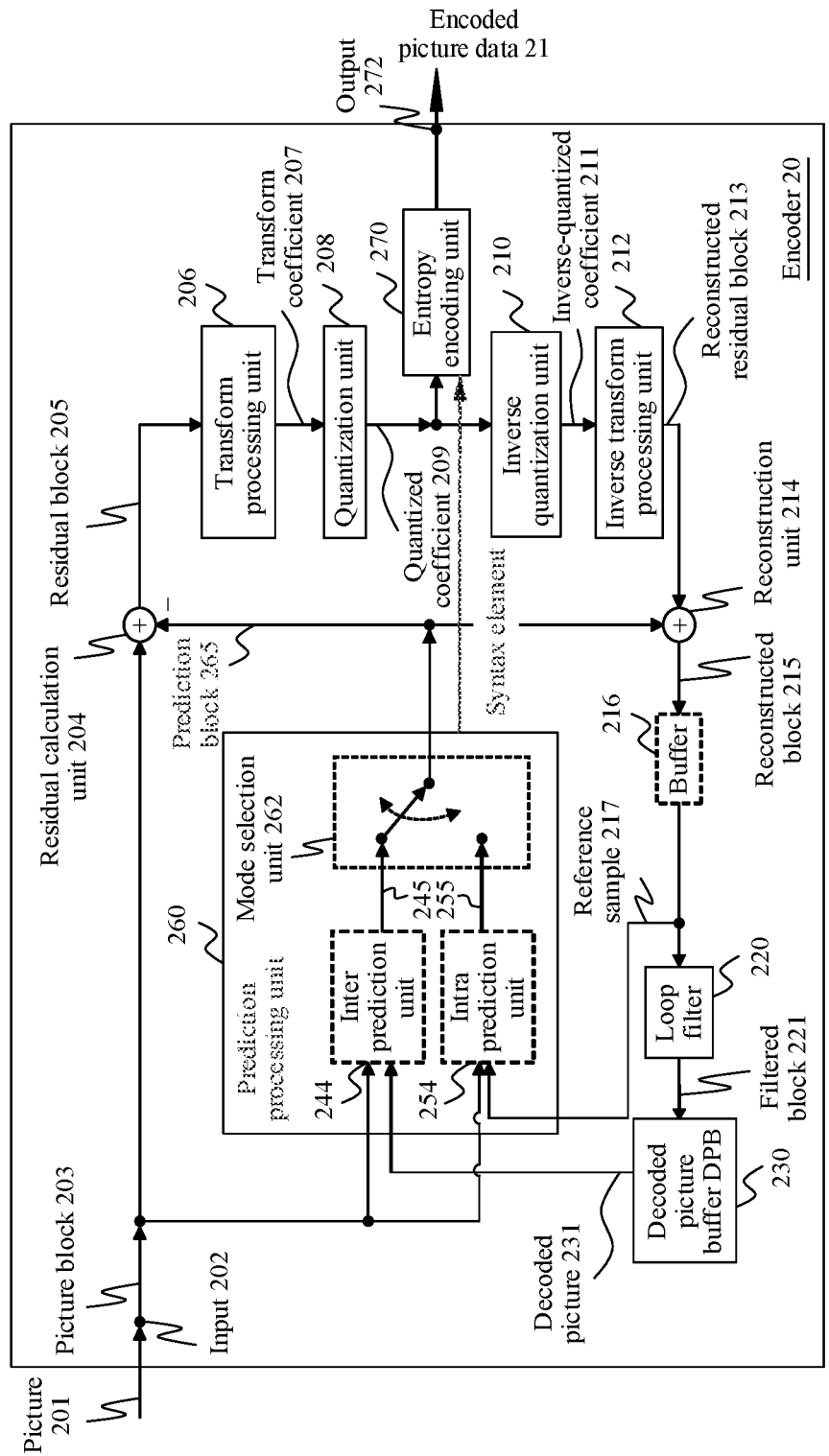
FIG. 2 is a block diagram illustrating an example structure of a video encoder for implementing an embodiment of the present disclosure.
Figure 3:
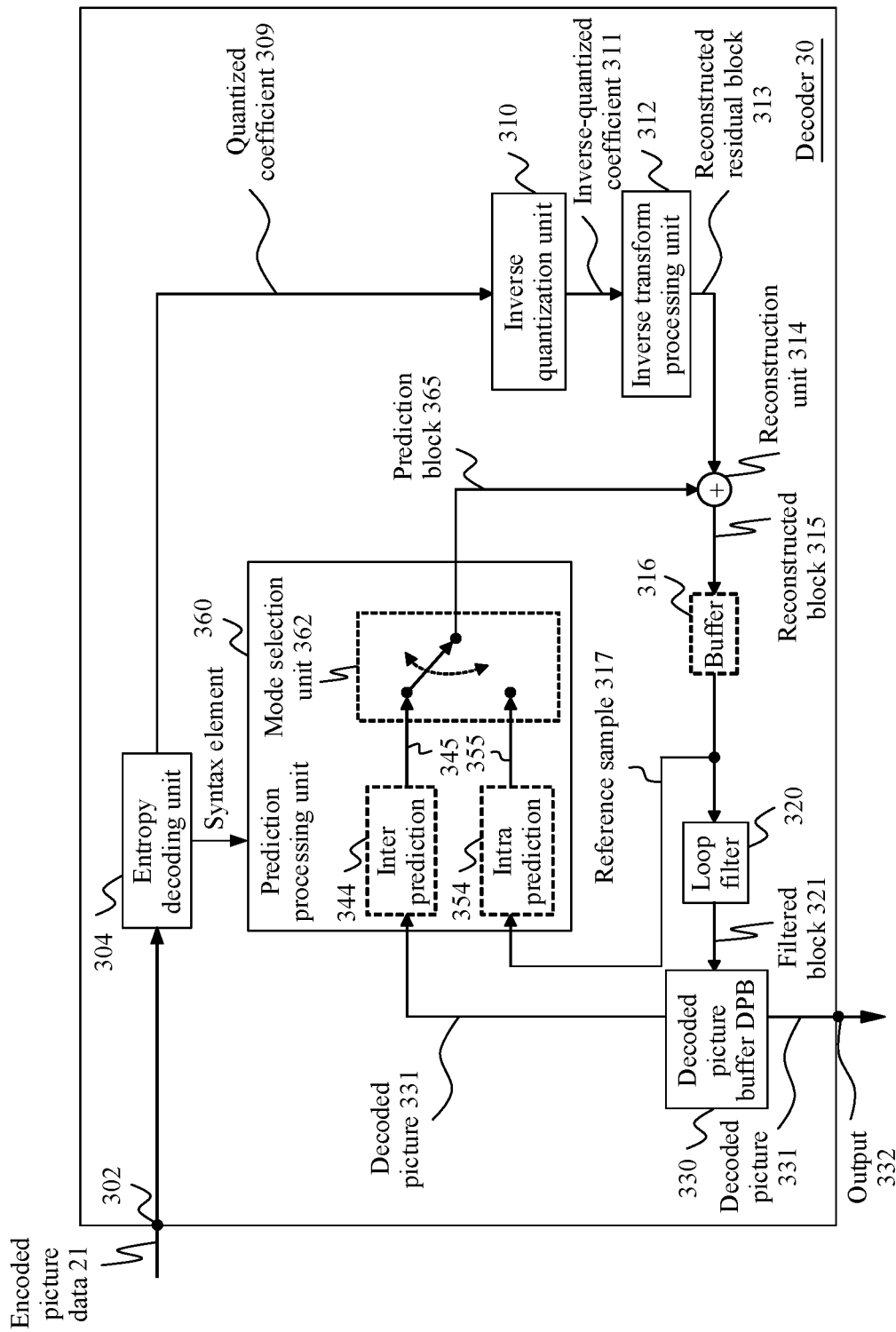
FIG. 3 is a block diagram illustrating an example structure of a video decoder for implementing an embodiment of the present disclosure.

FIG. 1B is a diagram illustrating an example of a video coding system 40 including the encoder 20 in FIG. 2 and/or the decoder 30 in FIG. 3 according to an example embodiment. The system 40 may implement a combination of various technologies of this application. In the illustrated implementation, the video coding system 40 may include an imaging device 41, the video encoder 20, the video decoder 30 (and/or a video decoder implemented by a logic circuit 47 of a processing unit 46), an antenna 42, one or more processors 43, one or more memories 44, and/or a display device 45.

As shown in the figure, the imaging device 41, the antenna 42, the processing unit 46, the logic circuit 47, the video encoder 20, the video decoder 30, the processor 43, the memory 44, and/or the display device 45 can communicate with each other. As described, although the video coding system 40 is illustrated with both the video encoder 20 and the video decoder 30, in different examples, the video coding system 40 may include only the video encoder 20 or only the video decoder 30.

In some examples, as shown in the figure, the video coding system 40 may include the antenna 42. For example, the antenna 42 may be configured to transmit or receive an encoded bitstream of video data. In addition, in some examples, the video coding system 40 may include the display device 45. The display device 45 may be configured to present the video data. In some examples, as shown in the figure, the logic circuit 47 may be implemented by the processing unit 46. The processing unit 46 may include ASIC logic, a GPU, a general purpose processor, or the like. The video coding system 40 may also include the optional processor 43. The optional processor 43 may similarly include ASIC logic, a GPU, a general purpose processor, or the like. In some examples, the logic circuit 47 may be implemented by hardware such as video encoding dedicated hardware, and the processor 43 may be implemented by universal software, an operating system, or the like. In addition, the memory 44 may be any type of memory, for example, a volatile memory (for example, a static random-access memory (SRAM) or a dynamic random-access memory (DRAM)) or a nonvolatile memory (for example, a flash memory). In a non-limitative example, the memory 44 may be implemented by a cache memory. In some examples, the logic circuit 47 may access the memory 44 (for example, to implement a picture buffer). In other examples, the logic circuit 47 and/or the processing unit 46 may include a memory (for example, a cache) to implement a picture buffer or the like.

In some examples, the video encoder 20 implemented by the logic circuit may include a picture buffer (for example, implemented by the processing unit 46 or the memory 44) and a GPU (for example, implemented by the processing unit 46). The GPU may be communicatively coupled to the picture buffer. The PGU may include the video encoder 20 implemented by the logic circuit 47, to implement various modules that are described with reference to FIG. 2 and/or any other encoder system or subsystem described in this specification. The logic circuit may be configured to perform various operations described in this specification.

The video decoder 30 may be similarly implemented by the logic circuit 47, to implement various modules that are described with reference to the decoder 30 in FIG. 3 and/or any other decoder system or subsystem described in this specification. In some examples, the video decoder 30 implemented by the logic circuit may include a picture buffer (implemented by the processing unit 46 or the memory 44) and a GPU (for example, implemented by the processing unit 46). The GPU may be communicatively coupled to the picture buffer. The GPU may include the video decoder 30 implemented by the logic circuit 47, to implement various modules that are described with reference to FIG. 3 and/or any other decoder system or subsystem described in this specification.

In some examples, the antenna 42 of the video coding system 40 may be configured to receive an encoded bitstream of video data. As described, the encoded bitstream may include data, an indicator, an index value, mode selection data, or the like that is related to video frame encoding described in this specification, for example, data related to encoding partitioning (for example, a transform coefficient or a quantized transform coefficient, an optional indicator (as described), and/or data defining encoding partitioning). The video coding system 40 may further include the video decoder 30 that is coupled to the antenna 42 and that is configured to decode the encoded bitstream. The display device 45 is configured to present a video frame.

Encoder & Encoding Method

FIG. 2 is a schematic/conceptual block diagram of an example of a video encoder 20 configured to implement the technologies in this application (disclosure). In the example in FIG. 2, the video encoder 20 includes a residual calculation unit 204, a transform processing unit 206, a quantization unit 208, an inverse quantization unit 210, an inverse transform processing unit 212, a reconstruction unit 214, a buffer 216, a loop filter unit 220, a decoded picture buffer (DPB) 230, a prediction processing unit 260, and an entropy encoding unit 270. The prediction processing unit 260 may include an inter prediction unit 244, an intra prediction unit 254, and a mode selection unit 262. The inter prediction unit 244 may include a motion estimation unit and a motion compensation unit (not shown in the figure). The video encoder 20 shown in FIG. 2 may also be referred to as a hybrid video encoder or a hybrid video codec-based video encoder.

For example, the residual calculation unit 204, the transform processing unit 206, the quantization unit 208, the prediction processing unit 260, and the entropy encoding unit 270 form a forward signal path of the encoder 20, and the inverse quantization unit 210, the inverse transform processing unit 212, the reconstruction unit 214, the buffer 216, the loop filter unit 220, the DPB 230, the prediction processing unit 260, and the like form a backward signal path of the encoder. The backward signal path of the encoder corresponds to a signal path of a decoder (referring to a decoder 30 in FIG. 3).

The encoder 20 receives a picture 201 or a block 203 of the picture 201 by using an input 202 or the like, for example, a picture in a sequence of pictures that form a video or a video sequence. The picture block 203 may also be referred to as a current picture block or a to-be-encoded picture block, and the picture 201 may be referred to as a current picture or a to-be-encoded picture (especially when the current picture is distinguished from another picture in video coding, other pictures, for example, in a same video sequence, also include previously encoded and/or decoded pictures in the video sequence of the current picture).

Partitioning

The embodiment of the encoder 20 may include a partitioning unit (not shown in FIG. 2) configured to partition the picture 201 into a plurality of non-overlapping blocks such as blocks 203. The partitioning unit may be configured to use a same block size for all pictures in the video sequence and a corresponding raster defining the block size, or may be configured to: change a block size between pictures, subsets, or picture groups, and partition each picture into corresponding blocks.

In an example, the prediction processing unit 260 of the video encoder 20 may be configured to perform any combination of the foregoing partitioning technologies.

For example, in the picture 201, the block 203 is also or may be also considered as a two-dimensional array or matrix of samples with luma values (sample values), although a size of the block 203 is smaller than that of the picture 201. In other words, the block 203 may include, for example, one sample array (for example, a luminance array in a case of a monochrome picture 201), three sample arrays (for example, one luminance array and two chrominance arrays in a case of a color picture), or any other quantity and/or type of arrays based on a used color format. A quantity of samples in horizontal and vertical directions (or axes) of the block 203 defines the size of block 203.

The encoder 20 shown in FIG. 2 is configured to encode the picture 201 block by block, for example, perform encoding and prediction on each block 203.

Residual Calculation

The residual calculation unit 204 is configured to calculate a residual block 205 based on the picture block 203 and a prediction block 265 (further details about the prediction block 265 are provided below), for example, obtain the residual block 205 in sample domain by subtracting a sample value of the prediction block 265 from a sample value of the picture block 203 sample by sample (pixel by pixel).

Transform

The transform processing unit 206 is configured to apply transform such as discrete cosine transform (DCT) or discrete sine transform (DST) to a sample value of the residual block 205, to obtain a transform coefficient 207 in transform domain. The transform coefficient 207 may also be referred to as a residual transform coefficient, and indicates the residual block 205 in transform domain.

The transform processing unit 206 may be configured to apply integer approximation of DCT/DST, for example, transform specified in High Efficiency Video Coding (HEVC)/H.265. This integer approximation is usually scaled proportionally by a factor compared with orthogonal DCT transform. To maintain the norm of a residual block obtained through forward transform and inverse transform, an additional scale factor is applied as a part of the transform process. The scale factor is usually selected based on some constraint conditions, for example, is a power of 2, a bit depth of a transform coefficient, or trade-off between accuracy and implementation costs that is used for a shift operation. For example, a specific scale factor is specified for inverse transform on a decoder 30 side by using the inverse transform processing unit 212 (and correspondingly, for inverse transform on an encoder 20 side by using the inverse transform processing unit 212 or the like), and correspondingly, a corresponding scale factor may be specified for forward transform on an encoder 20 side by using the transform processing unit 206.

Quantization

The quantization unit 208 is configured to quantize the transform coefficient 207 by applying scale quantization, vector quantization, or the like, to obtain a quantized transform coefficient 209. The quantized transform coefficient 209 may also be referred to as a quantized residual coefficient 209. The quantization process may reduce a bit depth related to some or all transform coefficients 207. For example, an n-bit transform coefficient may be rounded down to an m-bit transform coefficient during quantization, where n is greater than m. A quantization degree may be modified by adjusting a quantization parameter (QP). For example, for scale quantization, different scales may be applied to achieve finer or coarser quantization. A smaller quantization step corresponds to finer quantization, and a larger quantization step corresponds to coarser quantization. A proper quantization step may be indicated by using a QP. For example, the QP may be an index of a predefined set of proper quantization steps. For example, a smaller QP may correspond to finer quantization (a smaller quantization step) and a larger QP may correspond to coarser quantization (a larger quantization step), and vice versa. The quantization may include division by a quantization step and corresponding quantization or inverse quantization performed by the inverse quantization unit 210 or the like, or may include multiplication by a quantization step. In embodiments according to some standards such as HEVC, a QP may be used to determine a quantization step. Generally, the quantization step may be calculated based on the QP through a fixed point approximation of an equation including division. Additional scale factors may be introduced for quantization and inverse quantization, to restore the norm that is of a residual block and that may be modified because of a scale used in the fixed point approximation of the equation used for the quantization step and the QP. In an example implementation, a scale of inverse transform may be combined with a scale of inverse quantization. Alternatively, a customized quantization table may be used and signaled from an encoder to a decoder, for example, in a bitstream. The quantization is a lossy operation, and a larger quantization step indicates a larger loss.

The inverse quantization unit 210 is configured to apply inverse quantization of the quantization unit 208 to a quantized coefficient to obtain an inverse-quantized coefficient 211, for example, apply, based on or by using a same quantization step as the quantization unit 208, an inverse quantization scheme of the quantization scheme applied by the quantization unit 208. The inverse-quantized coefficient 211 may also be referred to as an inverse-quantized residual coefficient 211, and correspond to the transform coefficient 207, although a loss caused by quantization is usually different from the transform coefficient.

The inverse transform processing unit 212 is configured to apply inverse transform of the transform applied by the transform processing unit 206, for example, inverse DCT or inverse DST, to obtain an inverse transform block 213 in sample domain. The inverse transform block 213 may also be referred to as an inverse transform inverse-quantized block 213 or an inverse transform residual block 213.

The reconstruction unit 214 (for example, a summator 214) is configured to add the inverse transform block 213 (that is, a reconstructed residual block 213) to the prediction block 265 to obtain a reconstructed block 215 in sample domain, for example, by adding a sample value of the reconstructed residual block 213 and a sample value of the prediction block 265.

Optionally, the buffer unit 216 (or the "buffer" 216) such as a line buffer 216 is configured to buffer or store the reconstructed block 215 and a corresponding sample value for intra prediction and the like. In other embodiments, an encoder may be configured to use an unfiltered reconstructed block and/or a corresponding sample value that are/is stored in the buffer unit 216 for any type of estimation and/or prediction such as intra prediction.

For example, the embodiment of the encoder 20 may be configured, so that the buffer unit 216 is not only configured to store the reconstructed block 215 for intra prediction, but also configured to store the filtered block 221 of the loop filter unit 220 (not shown in FIG. 2), and/or the buffer unit 216 and the DPB 230 form one buffer. Other embodiments may be used to use a filtered block 221 and/or a block or a sample from the DPB 230 (not shown in FIG. 2) as an input or a basis for intra prediction 254.

The loop filter unit 220 (or the "loop filter" 220) is configured to perform filtering on the reconstructed block 215 to obtain the filtered block 221, so as to smoothly perform pixel transform or improve video quality. The loop filter unit 220 is intended to represent one or more loop filters, for example, a deblocking filter, a sample-adaptive offset (SAO) filter, or another filter such as a bilateral filter, an adaptive loop filter (ALF), a sharpening or smoothing filter, or a cooperative filter. Although the loop filter unit 220 is shown in FIG. 2 as an in-loop filter, the loop filter unit 220 may be implemented as a post-loop filter in other configurations. The filtered block 221 may also be referred to as a filtered reconstructed block 221. The DPB 230 may store the reconstructed coding block after the loop filter unit 220 performs a filtering operation on the reconstructed coding block.

The embodiment of the encoder 20 (correspondingly, the loop filter unit 220) may be used to output a loop filter parameter (for example, sample adaptive offset information), for example, directly output a loop filter parameter or output a loop filter parameter after the entropy encoding unit 270 or any other entropy encoding unit performs entropy encoding, so that the decoder 30 can receive and apply a same loop filter parameter for decoding, and the like.

The DPB 230 may be a reference picture memory that stores reference picture data for the video encoder 20 to encode video data. The DPB 230 may be any one of a plurality of memories, for example, DRAM (including a synchronous DRAM (SDRAM), a magnetoresistive RAM (MRAM), or a resistive RAM (RRAM)), or another type of memory. The DPB 230 and the buffer 216 may be provided by a same memory or separate memories. In an example, the DPB 230 is configured to store the filtered block 221. The DPB 230 may be further configured to store other previous filtered blocks such as previous reconstructed and filtered blocks 221 of a same current picture or different pictures such as previous reconstructed pictures, and may provide a complete previous reconstructed, that is, decoded picture (and a corresponding reference block and a corresponding sample) and/or a partially reconstructed current picture (and a corresponding reference block and a corresponding sample) for inter prediction and the like. In an example, if the reconstructed block 215 is reconstructed without in-loop filtering, the DPB 230 is configured to store the reconstructed block 215.

The prediction processing unit 260 is also referred to as a block prediction processing unit 260, and is configured to: receive or obtain the block 203 (the current block 203 of the current picture 201) and reconstructed picture data, for example, a reference sample from a same (current) picture in the buffer 216 and/or reference picture data 231 from one or more previous decoded pictures in the DPB 230, and process such data for prediction, that is, provide a prediction block 265 that may be an inter prediction block 245 or an intra prediction block 255.

The mode selection unit 262 may be configured to select a prediction mode (for example, an intra or inter prediction mode) and/or a corresponding prediction block 245 or 255 as the prediction block 265, to calculate the residual block 205 and reconstruct the reconstructed block 215.

The embodiment of the mode selection unit 262 may be used to select a prediction mode (for example, from prediction modes supported by the prediction processing unit 260). The prediction mode provides a best match or a minimum residual (the minimum residual means better compression in transmission or storage), or provides minimum signaling overheads (the minimum signaling overheads mean better compression in transmission or storage), or considers or balances the two. The mode selection unit 262 may be configured to determine a prediction mode based on rate distortion optimization (RDO), that is, select a prediction mode that provides minimum rate distortion optimization, or select a prediction mode in which related rate distortion at least meets a prediction mode selection criterion.

The prediction processing (for example, by using the prediction processing unit 260) and the mode selection (for example, by using the mode selection unit 262) performed by an example of the encoder 20 are described in detail below.

As described above, the encoder 20 is configured to determine or select a best or optimal prediction mode from a (predetermined) prediction mode set. The prediction mode set may include, for example, an intra prediction mode and/or an inter prediction mode.

An intra prediction mode set may include 35 different intra prediction modes, or may include 67 different intra prediction modes, or may include intra prediction modes defined in H.266 under development.

An inter prediction mode set depends on an available reference picture (for example, at least a part of the decoded picture stored in the DBP 230) and other inter prediction parameters, for example, depends on whether the entire reference picture is used or only a part of the reference picture is used, for example, a search window region surrounding a region of a current block is searched for a best matched reference block, and/or depends on whether pixel interpolation such as half-pixel and/or quarter-pixel interpolation is applied.

In addition to the foregoing prediction modes, a skip mode and/or a direct mode may also be applied.

The prediction processing unit 260 may be further configured to: partition the block 203 into smaller block partitions or subblocks, for example, by iteratively using quad-tree (QT) partitioning, binary-tree (BT) partitioning, triple-tree (TT) partitioning, or any combination thereof, and perform prediction and the like on each of the block partitions or the subblocks. The mode selection includes selecting a tree structure of the partitioned block 203 and selecting a prediction mode applied to each of the block partitions or the subblocks.

The inter prediction unit 244 may include a motion estimation (ME) unit (not shown in FIG. 2) and a motion compensation (MC) unit (not shown in FIG. 2). The motion estimation unit is configured to receive or obtain the picture block 203 (the current picture block 203 of the current picture 201) and the decoded picture 31, or at least one or more previous reconstructed blocks, for example, one or more other reconstructed blocks different from the previous decoded picture 231, to perform motion estimation. For example, a video sequence may include the current picture and the previous decoded picture 31. In other words, the current picture and the previous decoded picture 31 may be a part of a sequence of pictures that form the video sequence, or form the picture sequence.

For example, the encoder 20 may be configured to: select a reference block from a plurality of reference blocks of a same picture or different pictures in a plurality of other pictures, and provide a reference picture (or a reference picture index) and/or an offset (a spatial offset) between a location (X-Y coordinates) of the reference block and a location of the current block as an inter prediction parameter to the motion estimation unit (not shown in FIG. 2). This offset is also referred to as a motion vector (MV).

The motion compensation unit is configured to: obtain, for example, receive an inter prediction parameter, and perform inter prediction based on or by using the inter prediction parameter to obtain the inter prediction block 245. The motion compensation performed by the motion compensation unit (not shown in FIG. 2) may include fetching or generating the prediction block based on a motion/block vector determined through motion estimation (possibly performing interpolation on sub-pixel precision). During interpolation filtering, an additional sample may be generated from known samples, thereby potentially increasing a quantity of candidate prediction blocks that may be used to encode a picture block. Once a motion vector used for a PU of a current picture block is received, the motion compensation unit 246 may locate a prediction block to which the motion vector points in a reference picture list. The motion compensation unit 246 may further generate a syntax element associated with a block and a video slice, so that the video decoder 30 uses the syntax element when decoding a picture block of the video slice.

Inter prediction is a prediction technology based on motion compensation, and is mainly processed as determining motion information of a current block, obtaining a reference picture block from a reference frame based on the motion information, and generating a prediction picture of the current block. The motion information includes an inter prediction direction, a reference frame index (reference index, ref_idx), a MV, and the like. During inter prediction, the inter prediction direction is used to indicate a prediction direction in forward prediction, backward prediction, or bidirectional prediction that is used for the current block, the reference frame index (reference index) is used to indicate a reference frame, and the motion vector is used to indicate a location offset of a reference block of a current block in the reference frame relative to the current block in the current frame. The motion vector indicates a displacement vector of a reference picture block in the reference frame that is used to predict the current block relative to the current block. Therefore, one motion vector corresponds to one reference picture block.

The intra prediction unit 254 is configured to obtain, for example, receive a picture block 203 (a current picture block) of the same picture and one or more previous reconstructed blocks such as reconstructed neighboring blocks, to perform intra estimation. For example, the encoder 20 may be configured to select an intra prediction mode from a plurality of intra prediction modes.

The embodiment of the encoder 20 may be configured to select an intra prediction mode based on an optimization criterion, for example, based on a minimum residual (for example, an intra prediction mode providing the prediction block 255 that is most similar to the current picture block 203) or minimum rate distortion.

The intra prediction unit 254 is further configured to determine the intra prediction block 255 based on an intra prediction parameter of the selected intra prediction mode. In any case, after selecting the intra prediction mode used for a block, the intra prediction unit 254 is further configured to provide the intra prediction parameter to the entropy encoding unit 270, that is, provide information for indicating the selected intra prediction mode used for a block. In an example, the intra prediction unit 254 may be configured to perform any combination of the following intra prediction technologies.

The entropy encoding unit 270 is configured to apply an entropy encoding algorithm or scheme (for example, a variable length coding (VLC) scheme, a context adaptive VLC (CAVLC) scheme, an arithmetic coding scheme, a context adaptive binary arithmetic coding (CABAC) scheme, a syntax-based context-adaptive binary arithmetic coding (SBAC) scheme, a probability interval partitioning entropy (PIPE) coding scheme, or another entropy encoding method or technology) to one or more (or none) of the quantized residual coefficient 209, the inter prediction parameter, the intra prediction parameter, and/or the loop filter parameter, to obtain the encoded picture data 21 that can be output by using an output 272, for example, in a form of an encoded bitstream. The encoded bitstream may be transmitted to the video decoder 30, or may be archived for subsequent transmission or retrieval by the video decoder 30. The entropy encoding unit 270 may be further configured to perform entropy encoding on another syntax element of the current video slice that is being encoded.

Another structural variant of the video encoder 20 may be configured to encode a video stream. For example, the non-transform-based encoder 20 may directly quantize a residual signal without the transform processing unit 206 for some blocks or frames. In another implementation, the encoder 20 may have the quantization unit 208 and the inverse quantization unit 210 that are combined into one unit.

FIG. 3 shows an example of a video decoder 30 configured to implement the technologies in this application. The video decoder 30 is configured to receive encoded picture data (for example, an encoded bitstream) 21 encoded by the encoder 20 or the like, to obtain a decoded picture 231. In a decoding process, the video decoder 30 receives video data from the video encoder 20, for example, an encoded video bitstream that indicates a picture block of an encoded video slice and an associated syntax element.

In the example of FIG. 3, the decoder 30 includes an entropy decoding unit 304, an inverse quantization unit 310, an inverse transform processing unit 312, a reconstruction unit 314 (for example, a summator 314), a buffer 316, a loop filter 320, a DPB 330, and a prediction processing unit 360. The prediction processing unit 360 may include an inter prediction unit 344, an intra prediction unit 354, and a mode selection unit 362. In some examples, the video decoder 30 may perform decoding traversal generally inverse to the encoding traversal described with reference to the video encoder 20 in FIG. 2.

The entropy decoding unit 304 is configured to perform entropy decoding on the encoded picture data 21, to obtain a quantized coefficient 309, a decoded coding parameter (not shown in FIG. 3), and/or the like, for example, any one or all of an inter prediction parameter, an intra prediction parameter, a loop filter parameter, and/or another syntax element (decoded). The entropy decoding unit 304 is further configured to forward the inter prediction parameter, the intra prediction parameter, and/or the other syntax element to the prediction processing unit 360. The video decoder 30 may receive a syntax element at a video slice level and/or a syntax element at a video block level.

The inverse quantization unit 310 may have a same function as the inverse quantization unit 110, the inverse transform processing unit 312 may have a same function as the inverse transform processing unit 212, the reconstruction unit 314 may have a same function as the reconstruction unit 214, the buffer 316 may have a same function same as the buffer 216, the loop filter 320 may have a same function as the loop filter 220, and the DPB 330 may have a same function as the DPB 230.

The prediction processing unit 360 may include the inter prediction unit 344 and the intra prediction unit 354. The inter prediction unit 344 may have a function similar to that of the inter prediction unit 244, and the intra prediction unit 354 may have a function similar to that of the intra prediction unit 254. The prediction processing unit 360 is usually configured to perform block prediction and/or obtain a prediction block 365 from the encoded data 21, and receive or obtain (explicitly or implicitly) a prediction-related parameter and/or information about a selected prediction mode, for example, from the entropy decoding unit 304.

When a video slice is encoded as an intra-encoded (I) slice, the intra prediction unit 354 of the prediction processing unit 360 is configured to generate the prediction block 365 used for a picture block of the current video slice based on a signaled intra prediction mode and data from a previous decoded block of a current frame or picture. When a video frame is encoded as an inter-coded (that is, B or P) slice, the inter prediction unit 344 (for example, a motion compensation unit) of the prediction processing unit 360 is configured to generate the prediction block 365 used for a video block of the current video slice based on a motion vector and another syntax element received from the entropy decoding unit 304. For inter prediction, a prediction block may be generated from one of reference pictures in one reference picture list. The video decoder 30 may construct reference frame lists: a list 0 and a list 1 by using a default construction technology based on a reference picture stored in the DPB 330.

The prediction processing unit 360 is configured to: determine prediction information used for the video block of the current video slice by parsing the motion vector and the other syntax element, and use the prediction information to generate the prediction block used for the current video block that is being decoded. For example, the prediction processing unit 360 determines, by using some received syntax elements, a prediction mode (for example, intra or inter prediction) used to encode a video block of a video slice, an inter prediction slice type (for example, a B slice, a P slice, or a generalized P/B (GPB) slice), construction information of one or more of pictures in a reference picture list used for a slice, a motion vector of each inter-encoded video block used for a slice, an inter prediction state of each inter-encoded video block used for a slice, and other information, to decode the video block of the current video slice.

The inverse quantization unit 310 may be configured to perform inverse quantization (that is, dequantization) on a quantized transform coefficient provided in the bitstream and decoded by the entropy decoding unit 304. The inverse quantization process may include: using a QP calculated by the video encoder 20 for each video block in the video slice, to determine a quantization degree that should be applied and determine an inverse quantization degree that should be applied.

The inverse transform processing unit 312 is configured to apply inverse transform (for example, inverse DCT, inverse integer transform, or a conceptually similar inverse transform process) to the transform coefficient, to generate a residual block in sample domain.

The reconstruction unit 314 (for example, the summator 314) is configured to add an inverse transform block 313 (that is, a reconstructed residual block 313) to the prediction block 365, to obtain a reconstructed block 315 in sample domain, for example, by adding a sample value of the reconstructed residual block 313 to a sample value of the prediction block 365.

The loop filter unit 320 (in an encoding loop or after an encoding loop) is configured to filter the reconstructed block 315 to obtain a filtered block 321, so as to smoothly perform pixel transform or improve video quality. In an example, the loop filter unit 320 may be configured to perform any combination of the following filtering technologies. The loop filter unit 320 is intended to represent one or more loop filters, for example, a deblocking filter, an SAO filter, or another filter such as a bilateral filter, an ALF, a sharpening or smoothing filter, or a collaborative filter. Although the loop filter unit 320 is shown in FIG. 3 as an in-loop filter, the loop filter unit 320 may be implemented as a post-loop filter in other configurations.

The filtered block 321 in a given frame or picture is then stored in the DPB 330 that stores a reference picture used for subsequent motion compensation.

The decoder 30 is configured to output the decoded picture 31 by using an output 332, and the like, to present the decoded picture 31 to the user or provide the decoded picture 31 for the user to view.

Another variant of the video decoder 30 may be configured to decode a compressed bitstream. For example, the decoder 30 may generate an output video stream without the loop filter unit 320. For example, the non-transform-based decoder 30 may directly dequantize a residual signal without the inverse transform processing unit 312 for some blocks or frames. In another implementation, the video decoder 30 may have the inverse quantization unit 310 and the inverse transform processing unit 312 that are combined into one unit.

Figure 4:
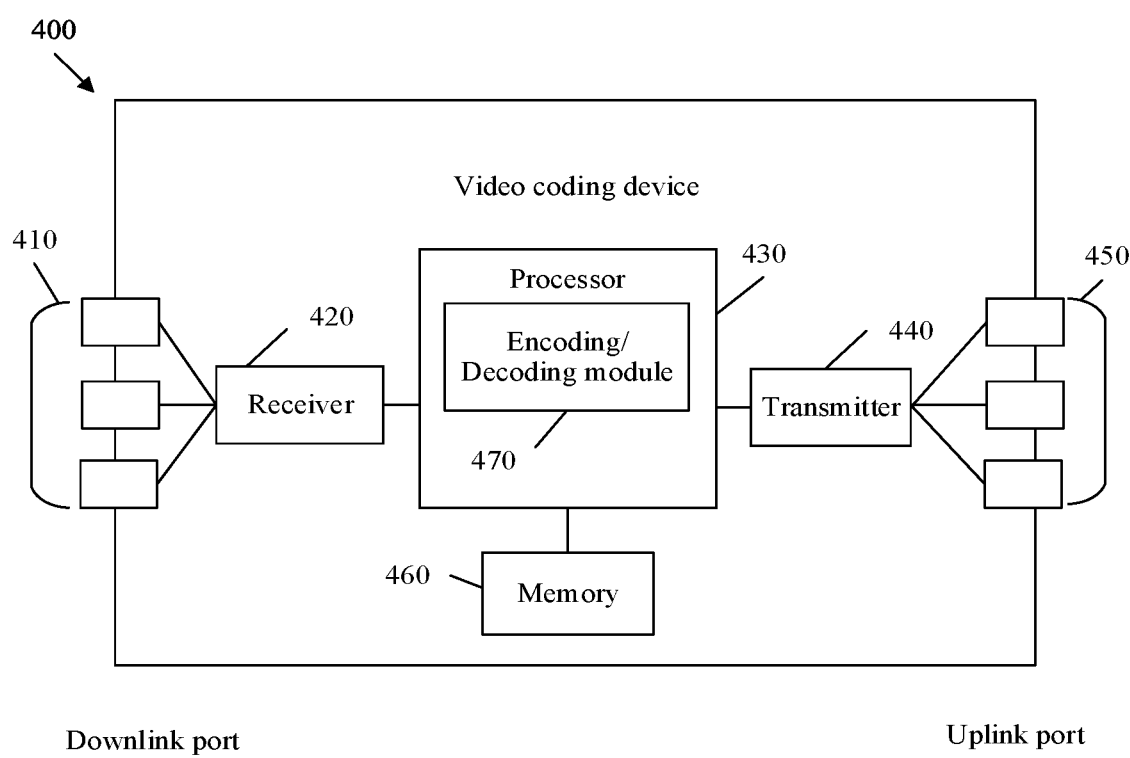
FIG. 4 is a block diagram illustrating an example of an encoding apparatus or a decoding apparatus.

FIG. 4 is a schematic structural diagram of a video coding device 400 (for example, a video encoding device 400 or a video decoding device 400) according to an embodiment of the present disclosure. The video coding device 400 is suitable for implementing an embodiment described in this specification. In an embodiment, the video coding device 400 may be a video decoder (for example, the video decoder 30 in FIG. 1A) or a video encoder (for example, the video encoder 20 in FIG. 1A). In another embodiment, the video coding device 400 may be one or more components in the video decoder 30 in FIG. 1A or the video encoder 20 in FIG. 1A.

The video coding device 400 includes: an ingress port 410 and a receiver unit (Rx) 420 that are configured to receive data; a processor, a logic unit, or a central processing unit (CPU) 430 that is configured to process data; a transmitter unit (Tx) 440 and an egress port 450 that are configured to transmit data; and a memory 460 configured to store data. The video coding device 400 may further include an optical-to-electrical conversion component and an electrical-to-optical (EO) conversion component that are coupled to the ingress port 410, the receiver unit 420, the transmitter unit 440, and the egress port 450, to serve as an egress or an ingress of an optical signal or an electrical signal.

The processor 430 is implemented by using hardware and software. The processor 430 may be implemented as one or more CPU chips, cores (for example, a multi-core processor), FPGAs, ASICs, or DSPs. The processor 430 communicates with the ingress port 410, the receiver unit 420, the transmitter unit 440, the egress port 450, and the memory 460. The processor 430 includes a coding module 470 (for example, an encoding module 470 or a decoding module 470). The encoding/decoding module 470 implements the foregoing disclosed embodiments. For example, the encoding/decoding module 470 performs, processes, or provides various coding operations. Therefore, the encoding/decoding module 470 substantially expands functions of the video coding device 400 and affects conversion of the video coding device 400 into different states. Alternatively, the encoding/decoding module 470 is implemented by using instructions stored in the memory 460 and executed by the processor 430.

The memory 460 includes one or more disks, tape drives, and solid-state drives, and may be used as an overflow data storage device, and is configured to store programs when these programs are selectively executed, and store instructions and data that are read during program execution. The memory 460 may be volatile and/or nonvolatile, and may be a read-only memory (ROM), a RAM, a ternary content-addressable memory (TCAM), and/or a SRAM.

Figure 5:
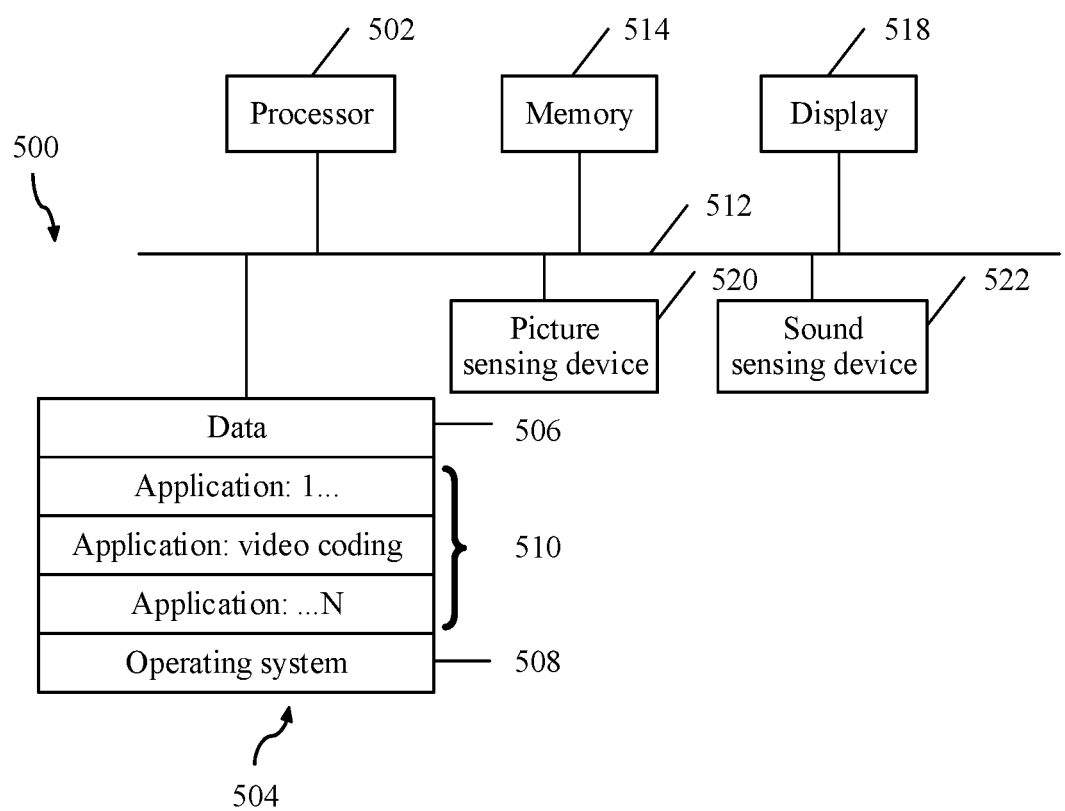
FIG. 5 is a block diagram illustrating an example of another encoding apparatus or another decoding apparatus.

FIG. 5 is a simplified block diagram of an apparatus 500 that can be used as any one or two of the source device 12 and the destination device 14 in FIG. 1A according to an example embodiment. The apparatus 500 may implement the technologies in this application. The apparatus 500 may use a form of a computing system including a plurality of computing devices, or may use a form of a single computing device such as a mobile phone, a tablet computer, a laptop computer, a notebook computer, or a desktop computer.

A processor 502 in the apparatus 500 may be a CPU. Alternatively, the processor 502 may be any other type of existing or future device or devices that can control or process information. As shown in the figure, although the disclosed implementations may be practiced by using a single processor such as the processor 502, advantages in speed and efficiency may be achieved by using at least one processor.

In an implementation, a memory 504 in the apparatus 500 may be a ROM device or a RAM device. Any other proper type of storage device may be used as the memory 504. The memory 504 may include code and data 506 that is accessed by the processor 502 by using a bus 512. The memory 504 may further include an operating system 508 and an application program 510. The application program 510 includes at least one program that allows the processor 502 to perform the method described in this specification. For example, the application program 510 may include applications 1 to N, and the applications 1 to N further include a video encoding application for performing the method described in this specification. The apparatus 500 may further include an additional memory in a form of a secondary memory 514. The secondary memory 514 may be, for example, a memory card used together with a mobile computing device. Because a video communication session may contain a large amount of information, the information may be completely or partially stored in the secondary memory 514 and loaded into the memory 504 for processing as required.

The apparatus 500 may further include one or more output devices, for example, a display 518. In an example, the display 518 may be a touch-sensitive display that combines a display with a touch-sensitive element that can be operated to sense a touch input. The display 518 may be coupled to the processor 502 by using the bus 512. In addition to the display 518, another output device that allows a user to program the apparatus 500 or use the apparatus 500 in another manner may be further provided, or another output device may be provided as an alternative to the display 518. When the output device is a display or includes a display, the display may be implemented differently, for example, by using a LCD, a cathode-ray tube (CRT) display, a plasma display, or a light emitting diode (LED) display such as an OLED display.

The apparatus 500 may further include a picture sensing device 520, or may be connected to the picture sensing device 520. The picture sensing device 520 is, for example, a camera or any other existing or future picture sensing device 520 that can sense a picture. The picture is, for example, a picture of a user who runs the apparatus 500. The picture sensing device 520 may be placed directly facing the user who runs the apparatus 500. In an example, a location and an optical axis of the picture sensing device 520 may be configured, so that a field of view of the picture sensing device 520 includes a region adjacent to the display 518, and the display 518 can be seen from the region.

The apparatus 500 may further include a sound sensing device 522, or may be connected to the sound sensing device 522. The sound sensing device 522 is, for example, a microphone or any other existing or future sound sensing device that can sense a sound near the apparatus 500. The sound sensing device 522 may be placed directly facing the user who runs the apparatus 500, and may be configured to receive a sound such as a voice or another sound that is made by the user when the user runs the apparatus 500.

Although the processor 502 and the memory 504 of the apparatus 500 are integrated into one unit as illustrated in FIG. 5, other configurations can be used. The running of the processor 502 may be distributed in a plurality of machines that may be directly coupled (each machine has one or more processors), or may be distributed in a local region or in another network. The memory 504 may be distributed in a plurality of machines such as a network-based memory and a memory in a plurality of machines that run the apparatus 500. Although a single bus is drawn herein, there may be a plurality of buses 512 of the apparatus 500. Further, the secondary memory 514 may be directly coupled to the other components of the apparatus 500 or may be accessed through a network, and may include a single integrated unit such as a memory card, or a plurality of units such as a plurality of memory cards. Therefore, the apparatus 500 may be implemented in a plurality of configurations.

In a bitstream, motion information occupies a large amount of data. To reduce a required amount of data, motion information is usually transmitted through prediction. Generally, there are two types of modes: inter and merge.

Inter motion vector predictor (MVP) mode: Transmitted motion information includes: an inter prediction direction (forward, backward, or bidirectional), a reference frame index, a motion vector predictor index (MVP index), and a motion vector difference. For motion vector information in the motion information, a manner of transmitting a difference between an actual motion vector and an MVP is usually used. An encoder transmits the motion vector difference (MVD) between the MVP and the actual motion vector to a decoder. There may be a plurality of motion vector predictors. Generally, an MVP candidate list (mvp candidate list) is constructed in a same manner on the encoder and the decoder, and an MVP index is transmitted to the decoder.

Figure 6:
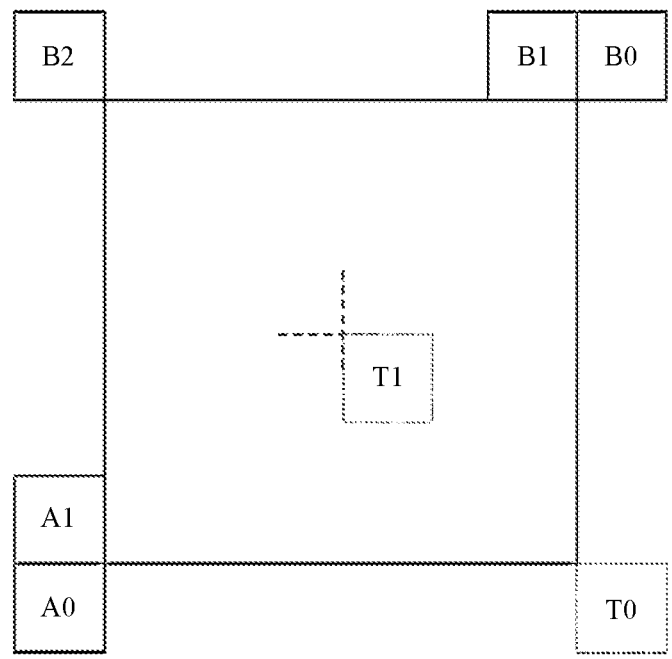
FIG. 6 shows an example of a spatial candidate and a temporal candidate of a current block.

Merge mode: A merge motion information candidate list (merge candidate list) is constructed in a same manner on an encoder and a decoder, and an index is transmitted to the decoder. A merge index is transmitted in a bitstream. Motion information in a motion information candidate list is usually obtained from a spatially neighboring block or a temporal block in a reference frame. Candidate motion information obtained from motion information of a picture block neighboring to a current block is referred to as a spatial candidate, and motion information of a picture block of a corresponding location of the current block in a reference picture is referred to as a temporal candidate. The spatial candidate and the temporal candidate of the current block are shown in FIG. 6.

Figure 7:
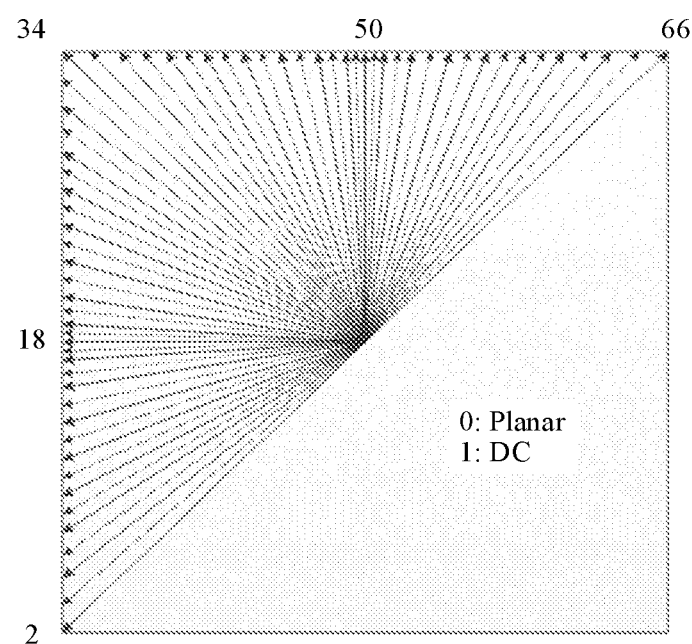
FIG. 7 is a schematic diagram of an intra prediction mode.

In an intra prediction mode, a directional interprediction manner is usually used, an interpolation direction is transmitted in a bitstream, and a predicted pixel of a current coding block is obtained on a decoder by using interpolation direction information and a spatially neighboring encoded pixel. Different prediction modes are shown in FIG. 7.

Triangular Prediction Unit Mode

Figure 8:
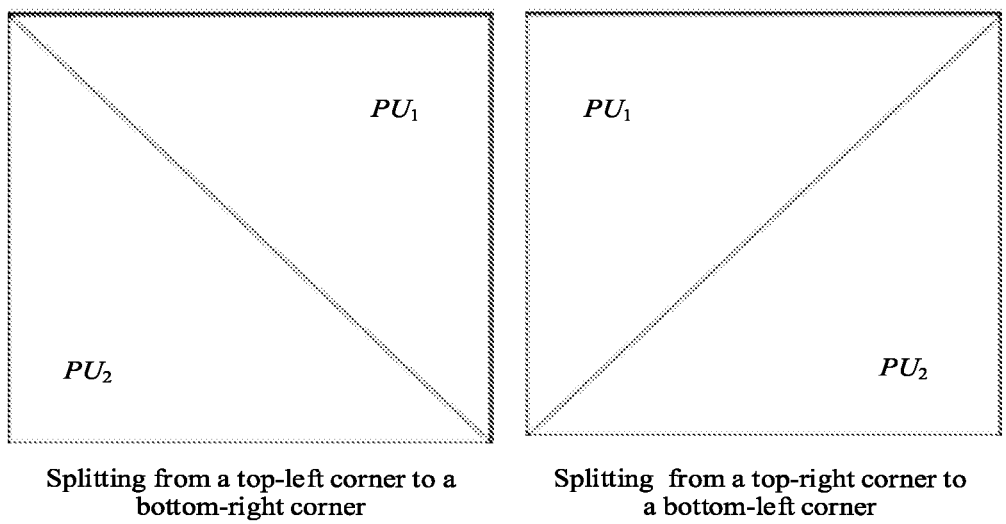
FIG. 8 is a schematic diagram of a triangular prediction unit mode.

A triangular prediction unit mode is to split a coding block into two triangular coding blocks along a diagonal based on inter encoding in original HEVC or Versatile Video Coding (VVC) Test Model (VTM). Each triangular coding block uses separate motion information. Diagonal splitting may be diagonal splitting or inverse diagonal splitting, as shown in FIG. 8. Splitting from a top-left corner to a bottom-right corner of the current coding block is diagonal splitting, and splitting from a top-right corner to a bottom-left corner of the current coding block is inverse diagonal splitting. The inverse diagonal splitting may also be referred to as back diagonal splitting. The triangular prediction unit mode is only used in motion compensation prediction, and is performed on an entire coding block obtained by combining two triangles in a transform and quantization process. The triangular prediction unit mode may be used for a coding block whose block size is greater than or equal to 8×8 and whose encoding mode is a merge or skip mode.

For a coding block for which the triangular prediction unit mode can be used, an identifier merge_triangle_flag is transmitted at a coding unit (CU) level to indicate whether the triangular prediction unit mode is used. When the triangular prediction unit mode is used for the current coding block/CU, a sequence number merge_triangle_idx is transmitted to indicate a direction in which the CU is split into two triangular prediction units and motion information of the two triangular prediction units. For example, directions of the two triangular prediction units and motion information indexes of the two triangular prediction units may be encapsulated by using a lookup table, and corresponding information is determined from the lookup table by using merge_triangle_idx. Then, each triangular prediction unit obtains unidirectional prediction information (uni-prediction candidate) from a unidirectional motion information candidate list (uni-prediction candidate list) based on the motion information index.

In a weighted pixel prediction process, an adaptive weighting process is performed according to a splitting direction and a weighting mode (weighting set (WS)) obtained from the splitting direction.

Encoding and Decoding in a Combined Intra and Inter Prediction Mode

In a coding block/CU for which a merge mode is used, an identifier mh_intra_flag is transmitted to indicate whether intra prediction is used. When intra prediction is used, an intra prediction block is generated based on an intra prediction mode selected from an intra candidate mode list (intra candidate list) based on intra encoding mode-related syntax elements mh_intra_luma_mpm_flag and mh_intra_luma_mpm_idx. For a luma block, the intra candidate mode list may include four modes: a DC mode, a planar mode, a horizontal mode, and a vertical mode. A size of the intra candidate mode list is selected based on a shape of the current coding block, and the intra candidate mode list may include three or four modes. When a width of the current coding block/CU is twice of a height of the current coding block/CU, the intra candidate mode list does not include the horizontal mode. When a height of the current coding block/CU is twice of a width of the current coding block/CU, the intra candidate mode list does not include the vertical mode. When the combined intra and inter prediction mode is used, intra prediction obtained based on an intra prediction mode index and inter prediction obtained based on a merge index are combined through weighted averaging. For a chroma component, only the derived mode (DM) mode is used.

In a weighting method of the combined intra and inter prediction mode, different weighting coefficients are used for different intra prediction modes. A same weighting coefficient is used for intra prediction when a DC mode and a planar mode are used, or a same weighting coefficient is used when a length or a width of a current coding block is less than or equal to 4. A variable weighting coefficient is used for intra prediction when a horizontal mode and a vertical mode are used.

In a multi-hypothesis (MH) encoding method of the combined intra and inter prediction mode, in a coding block/CU for which a merge mode is used, an identifier is transmitted to indicate whether intra prediction is used, or whether spatially neighboring pixels around the current coding block are used. When intra prediction is used, an intra prediction block is generated by using an intra prediction mode. For a luma block, an intra candidate mode is set to a planar mode. A final prediction block is generated by performing combined intra and inter prediction on a prediction block through adaptive weighting.

Both the merge triangular prediction unit mode and the multi-hypothesis encoding method of the combined intra and inter prediction mode involve a motion compensation process. A method and an apparatus provided in the embodiments of the present disclosure can combine two different prediction methods: the triangular prediction unit mode and the multi-hypothesis encoding method of the combined intra and inter prediction mode, thereby reducing encoding and decoding complexity and improving encoding and decoding performance and efficiency. According to the method provided in the embodiments of the present disclosure, processing on an encoder is similar to processing on a decoder. The following uses Embodiments 1 to 5 as an example for detailed description. Embodiments 1 to 5 may be performed by the apparatus or the system in FIG. 1A to FIG. 5.

Embodiment 1

Figure 9:
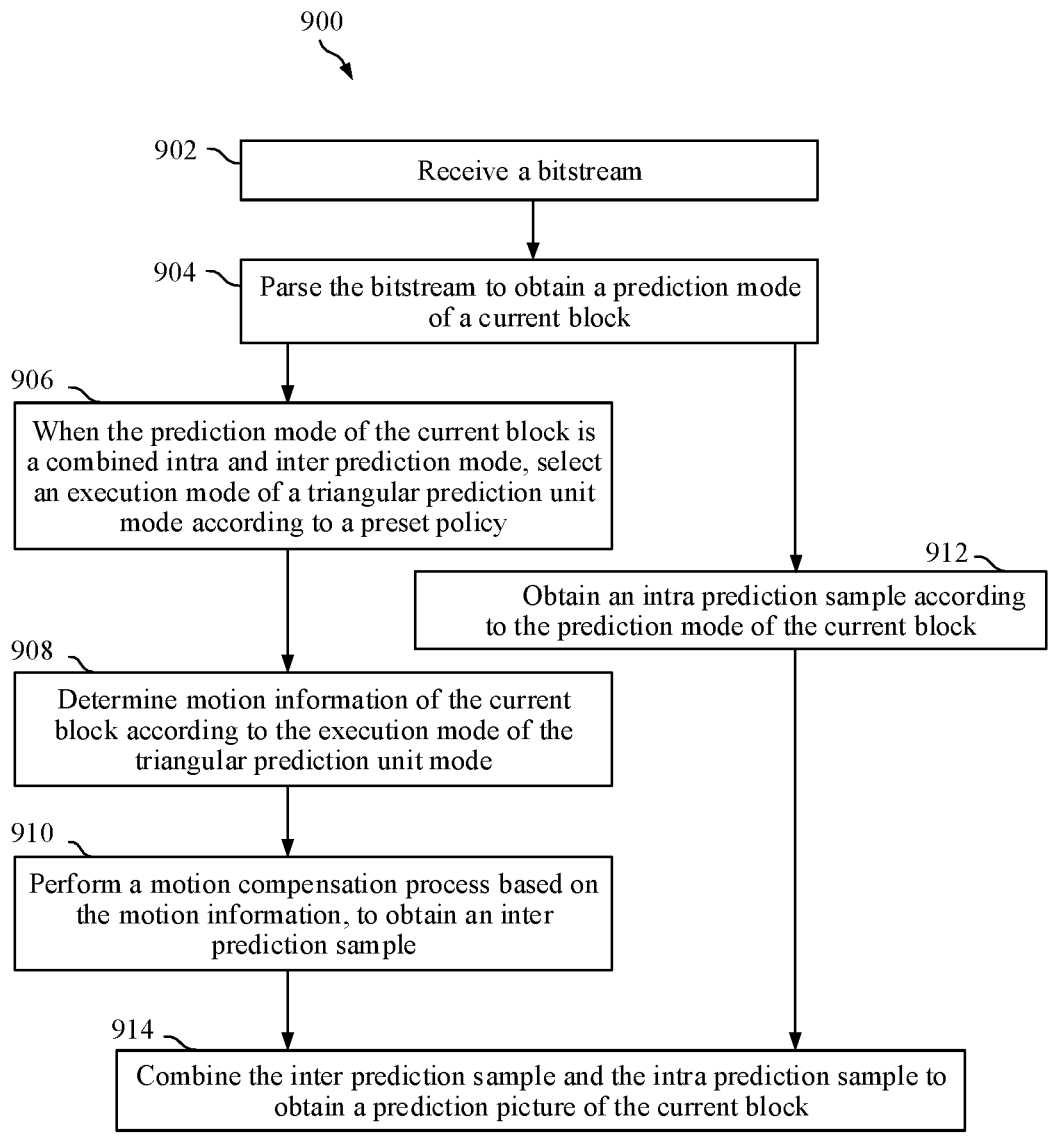
FIG. 9 is a schematic flowchart of an embodiment of the present disclosure.

Decoding processing is performed on at least one picture block in a picture to obtain a reconstructed picture of the picture block. As shown in FIG. 9, the foregoing decoding processing includes step 902 to step 914. A block on which decoding processing is being performed is referred to as a current block.

In this embodiment, a combined intra and inter prediction mode identifier is mh_intra_flag, and a triangular prediction unit mode identifier is merge_triangle_flag.

Step 902: Receive a bitstream.

Step 904: Parse the bitstream to obtain a prediction mode of the current block.

If the bitstream includes mh_intra_flag and mh_intra_flag is true, the prediction mode of the current block is a combined intra and inter prediction mode, and step 906 is performed.

Step 906: When the prediction mode of the current block is the combined intra and inter prediction mode, select an execution manner of a triangular prediction unit mode according to a preset policy. The following implementations are included:

Implementation 1: When the combined intra and inter prediction mode is used, the triangular prediction unit mode is not used.

intrainter_flag( );
If(intrainter_flag==0) Tri_flag( );
If(intrainter_flag( ))intra_mode( ) does not exist or its location is not limited
If(Tri_flag( )) triangle_idx( ) indicates that the location is not limited Implementation 2: When the combined intra and inter prediction mode is used, if an intra prediction mode is a DC or planar mode, the triangular prediction unit mode is not used; otherwise, the triangular prediction unit mode is used.

intrainter_flag( );
If(intrainter_flag( ))intra_mode( )
If((intrainter_flag==0)
||((intrainter_flag==1) &&(intra_mode!=DC)&& (intra_mode!=PLANAR)))
Tri_flag( );
If(Tri_flag( )) triangle_idx( )

Implementation 3: When the combined intra and inter prediction mode is used, if an intra prediction mode is a DC or planar mode, only back diagonal splitting is used in the triangular prediction unit mode; otherwise, diagonal splitting and back diagonal splitting are used in the triangular prediction unit mode.

Step 908: Determine motion information of the current block according to the execution manner of the triangular prediction unit mode.

Step 910: Perform a motion compensation process based on the motion information, to obtain an inter prediction sample.

Steps 908 and 910 may be combined to determine the motion compensation process according to the execution manner of the triangular prediction unit mode, and obtain the inter prediction sample. Then, there are the following manner 1 and manner 2.

Manner 1: If the triangular prediction unit mode is executed, the motion compensation process is performed according to the triangular prediction unit mode. For example, the bitstream may be parsed to obtain a triangular prediction unit mode index (merge_triangle_idx), and a splitting direction (TriangleDir) of the triangular prediction unit mode is obtained based on merge_triangle_idx. Further, a unidirectional motion information candidate list (uni-prediction candidate list) may be generated, and the motion information of the current block is determined from the unidirectional motion information candidate list based on the triangular prediction unit mode index.

Manner 2: If the triangular prediction unit mode is not executed, the motion compensation process is performed according to a merge mode. Further, a merge motion information candidate list may be generated, and then the motion information of the current block is determined based on a merge index carried in the bitstream.

Step 912: Obtain an intra prediction sample according to the prediction mode of the current block.

Further, the bitstream may be parsed to obtain an intra prediction mode-related syntax, and an intra prediction mode is selected from an intra candidate mode list (intra candidate list) based on the syntax. For example, the intra encoding mode syntax includes a most probable mode identifier mh_intra_luma_mpm_flag and a most probable mode index mh_intra_luma_mpm_idx.

Step 914: Combine the inter prediction sample and the intra prediction sample to obtain a prediction picture of the current block.

Steps 906 to 910 and step 912 are not subject to a specific sequence.

For details, refer to the following descriptions of Embodiments 3 to 5.

Embodiment 2

Figure 10:
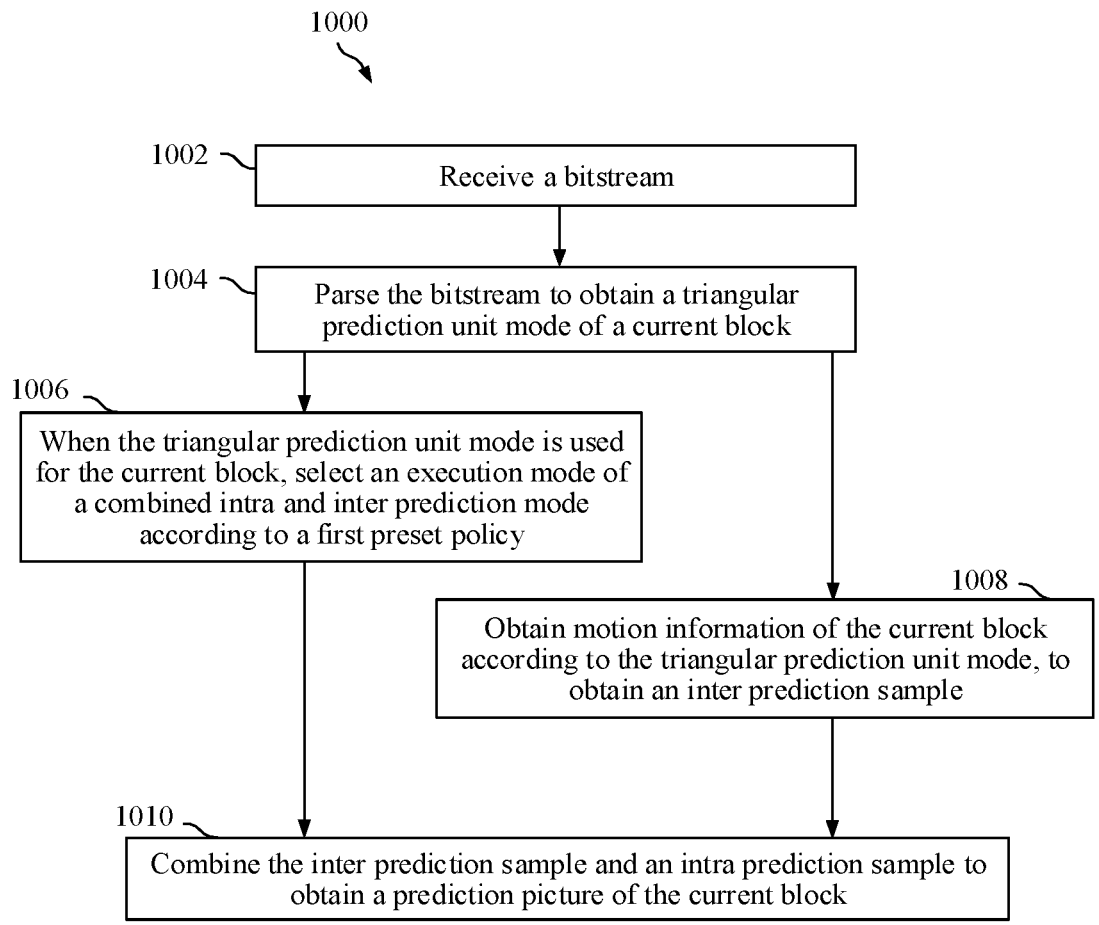
FIG. 10 is a schematic flowchart of another embodiment of the present disclosure.

Decoding processing is performed on at least one picture block in a picture to obtain a reconstructed picture of the picture block. As shown in FIG. 10, the foregoing decoding processing includes step 1002 to step 1010. A block on which decoding processing is being performed is referred to as a current block.

In this embodiment, a combined intra and inter prediction mode identifier is mh_intra_flag, and a triangular prediction unit mode identifier is merge_triangle_flag.

Step 1002: Receive a bitstream.

Step 1004: Parse the bitstream to obtain a triangular prediction unit mode of the current block.

If the bitstream includes merge_triangle_idx and merge_triangle_idx is true, the triangular prediction unit mode is used for the current block, and step 1006 is performed.

Step 1006: When the triangular prediction unit mode is used for the current block, select an execution manner of a combined intra and inter prediction mode according to a first preset policy. Further, the following implementations are included:

Implementation 1: When the triangular prediction unit mode is used, the combined intra and inter prediction mode is not used.

Tri_flag( )
If(tri_flag==0) intrainter_flag( );
If(intrainter_flag( ))intra_mode( ) does not exist or its location is not limited
If(Tri_flag( )) triangle_idx( ) indicates that the location is not limited Implementation 2: When the triangular prediction unit mode is used, if a triangle is split along a diagonal, the combined intra and inter prediction mode is not used.

Tri_flag( )
If(Tri_flag( )) triangle_idx( )
TriangleDir=getTriangleDir(triangle_idx);
If((tri_flag==0)
||((tri_flag==1)&&(TriangleDir==inverse diagonal)))
intrainter_flag( );
If(intrainter_flag( ))intra_mode( )

Implementation 3: When the triangular prediction unit mode is used, if a triangle is split along a diagonal, only horizontal prediction modes are used when the combined intra and inter prediction mode is used.

Step 1008: Obtain motion information of the current block according to the triangular prediction unit mode, to obtain an inter prediction sample.

For example, the bitstream may be parsed to obtain a triangular prediction unit mode index merge_triangle_idx, and a splitting direction TriangleDir of the triangular prediction unit mode is obtained from a lookup table based on merge_triangle_idx.

Then, a unidirectional motion information candidate list (uni-prediction candidate list) is generated, and the motion information of the current block is determined from the unidirectional motion information candidate list based on the triangular prediction unit mode index.

Step 1010: Obtain a prediction picture of the current block according to the execution manner of the combined intra and inter prediction mode and the inter prediction sample.

Further, if the combined intra and inter prediction mode is executed according to the first preset policy, an intra prediction sample is obtained according to the combined intra and inter prediction mode, and the inter prediction sample and the intra prediction sample are combined to obtain the prediction picture of the current block.

Alternatively, if the combined intra and inter prediction mode is not executed according to the first preset policy, the prediction picture of the current block is obtained according to the inter prediction sample.

Step 1006 and step 1008 are not subject to a specific sequence.

For details, refer to the following descriptions of Embodiments 3 to 5.

Embodiment 3

In Embodiment 3, decoding processing is performed on at least one picture block in a picture to obtain a reconstructed picture of the picture block. The foregoing decoding processing includes step 1101 to step 1106. A block on which decoding processing is being performed is referred to as a current block.

Step 1101: Parse an inter prediction mode of the current block to obtain a triangular prediction unit mode identifier, a combined intra and inter prediction mode identifier, and a mode-related syntax element.

If the current coding block/CU is in a merge mode, a joint parsing method for the triangular prediction unit mode identifier merge_triangle_flag and the combined intra and inter prediction mode identifier mh_intra_flag includes one of the following methods:

Method 1: When the current coding block/CU meets a separate constraint condition of the triangular prediction unit mode identifier merge_triangle_flag and transmission of merge_triangle_flag is allowed, merge_triangle_flag is parsed. When merge_triangle_flag indicates that a triangular prediction unit mode is not executed, and the current coding block/CU meets a separate constraint condition of the combined intra and inter prediction mode identifier mh_intra_flag and transmission of mh_intra_flag is allowed, mh_intra_flag is parsed. When the constraint condition is not met, mh_intra_flag is not parsed, and mh_intra_flag is 0. That is, when merge_triangle_flag indicates that the triangular prediction unit mode is executed, mh_intra_flag is not transmitted, and a multi-hypothesis method of a combined intra and inter prediction mode is not performed.

Method 2: When the current coding block/CU meets a separate constraint condition of the combined intra and inter prediction mode identifier mh_intra_flag and transmission of mh_intra_flag is allowed, mh_intra_flag is parsed. When mh_intra_flag indicates that a combined intra and inter prediction mode is not executed, and the current coding block/CU meets a separate constraint condition of the triangular prediction unit mode identifier merge_triangle_flag and transmission of merge_triangle_flag is allowed, merge_triangle_flag is parsed. Therefore, when the prediction mode of the current block is not the combined intra and inter prediction mode, a triangular prediction unit mode is executed for the current block. When the constraint condition of the triangular prediction unit mode is met, the triangular prediction unit mode identifier is 1. When the constraint condition is not met, merge_triangle_flag is not parsed, and merge_triangle_flag is 0. That is, when mh_intra_flag indicates that the combined intra and inter prediction mode is executed, merge_triangle_flag is not transmitted, and the triangular prediction unit mode is not executed. In this case, the constraint condition of the triangular prediction unit mode may be understood as a preset policy. When the prediction mode of the current block is the combined intra and inter prediction mode, the triangular prediction unit mode is not executed for the current block.

When merge_triangle_flag indicates that the triangular prediction unit mode is executed, a bitstream is parsed to obtain a triangular prediction unit mode index merge_triangle_idx, and partitioning information and motion information of the triangular prediction unit mode may be obtained from a lookup table based on merge_triangle_idx. In addition, each element in the lookup table may include partitioning information and a unidirectional motion information candidate list index of the triangular prediction unit mode. In specific implementation, when merge_triangle_flag indicates that the triangular prediction unit mode is executed, the bitstream may be parsed to obtain a splitting direction (TriangleDir) of the triangular prediction unit mode.

The identifier mh_intra_flag may be used to indicate whether the prediction mode of the current block is the combined intra and inter prediction mode. When mh_intra_flag indicates that the combined intra and inter prediction mode is executed, the bitstream is parsed to obtain an intra encoding mode-related syntax. The intra encoding mode-related syntax includes a most probable mode identifier mh_intra_luma_mpm_flag and a most probable mode index mh_intra_luma_mpm_idx, and then an intra encoding mode is extracted based on mh_intra_luma_mpm_flag and mh_intra_luma_mpm_idx. Alternatively, a fixed mode such as a planar mode may be directly used without transmitting any index.

It should be noted that a location of merge_triangle_idx in the bitstream is not specified in this embodiment of the present disclosure, provided that merge_triangle_idx is parsed after merge_triangle_flag.

In this embodiment of the present disclosure, locations of mh_intra_luma_mpm_flag and mh_intra_luma_mpm_idx in the bitstream are not specified, provided that mh_intra_luma_mpm_flag and mh_intra_luma_mpm_idx are parsed after mh_intra_flag.

It should be noted that, in this embodiment of the present disclosure, only a method for jointly using the triangular prediction unit mode identifier merge_triangle_flag and the combined intra and inter prediction mode identifier mh_intra_flag is used. A parsing method for the triangular prediction unit mode identifier merge_triangle_flag or the combined intra and inter prediction mode identifier mh_intra_flag is not limited. For example, the constraint may be as follows: The combined intra and inter prediction mode identifier mh_intra_flag is parsed only when a width and a height of the coding block/CU are greater than or equal to 8 and less than 128; otherwise, mh_intra_flag is not parsed, and mh_intra_flag is set to not executing the combined intra and inter prediction mode. The triangular prediction unit mode identifier merge_triangle_flag is parsed only when the width plus the height of the coding block/CU is greater than 12; otherwise, merge_triangle_flag is not parsed, and the merge_triangle_flag is set to not executing the triangular prediction unit mode.

Step 1102: Obtain the partitioning information and the motion information of the triangular prediction unit mode based on the triangular prediction unit mode identifier merge_triangle_flag and the triangular prediction unit mode index merge_triangle_idx.

If the current block is in a merge/skip mode and merge_triangle_flag is 0, a merge motion information candidate list is generated. Then, motion information of the current block is determined based on a merge index carried in the bitstream. A method in HEVC or VTM may be used, or another method for generating a motion vector predictor candidate list may be used. This is not limited in this embodiment of the present disclosure.

If the current block is in a merge/skip mode and merge_triangle_flag is 1, a unidirectional motion information candidate list (uni-prediction candidate list) is generated, and motion information is determined from the unidirectional motion information candidate list based on the partitioning information and the unidirectional motion information candidate list index of the triangular prediction unit mode that are determined from the lookup table by using merge_triangle_idx.

If the current block is in an inter MVP mode, motion information of the current block is determined based on an inter prediction direction, a reference frame index, a motion vector predictor index, and a motion vector difference that are transmitted in the bitstream. A method in HEVC or VTM may be used, or another method for generating a motion vector predictor candidate list may be used. This is not limited in this embodiment of the present disclosure.

Step 1103: Perform a motion compensation process based on the motion information, to obtain an inter prediction sample (prediction samples).

In step 1103, the motion compensation process and a weighted prediction process are performed based on the motion information of the current block, to obtain the inter prediction sample.

Step 1104: Obtain an intra prediction sample based on mh_intra_flag.

If mh_intra_flag is 1, one of the following methods may be used:

Method 1: Obtain an intra encoding mode based on mh_intra_luma_mpm_flag and mh_intra_luma_mpm_idx, and invoke an intra prediction module to generate an intra prediction block.

Method 2: Obtain an intra encoding mode based on mh_intra_luma_mpm_flag and mh_intra_luma_mpm_idx, and invoke an intra prediction module to generate an intra prediction block, where the intra prediction module does not use the following two intra encoding tools: boundary filtering and position dependent intra prediction combination (PDPC).

Method 3: Set an intra encoding mode to a planar mode, and invoke an intra prediction module to generate an intra prediction block.

Method 4: Set an intra encoding mode to a planar mode, and invoke an intra prediction module to generate an intra prediction block, where the intra prediction module does not use the following two intra encoding tools: boundary filtering and PDPC.

Step 1105: Combine the inter prediction sample and the intra prediction sample to obtain a final prediction block/prediction picture of the current block.

Furthermore, on a decoder, an adaptive weighting method, a fixed coefficient weighting manner, or an equal-proportion weighting manner is used.

Step 1106: Add the final inter prediction picture and a residual picture to obtain a reconstructed picture of the current block.

Furthermore, on the decoder, if the current block has a residual, residual information and the prediction picture are added to obtain the reconstructed picture of the current block; or if the current block has no residual, the prediction picture is the reconstructed picture of the current block.

It should be noted that a sequence of step 1102 and step 1103 may be interchanged. This is not limited in this embodiment of the present disclosure.

Embodiment 4

Embodiment 4 relates to an inter encoding and filtering method, and decoding processing on a picture block by using the method. A main difference from Embodiment 3 lies in step 1201.

Step 1201: Parse an inter prediction mode of a current block to obtain a triangular prediction unit mode identifier, a combined intra and inter prediction mode identifier, and a mode-related syntax element.

In a triangular prediction unit mode, a coding block is split into two triangular coding blocks along a diagonal. Diagonal splitting may be diagonal splitting or inverse diagonal splitting, as shown in FIG. 3. Splitting from a top-left corner to a bottom-right corner of the current coding block is diagonal splitting, and splitting from a top-right corner to a bottom-left corner of the current coding block is back diagonal splitting.

If the current coding block/CU is in a merge mode, a joint parsing method for the triangular prediction unit mode identifier merge_triangle_flag and the combined intra and inter prediction mode identifier mh_intra_flag mainly constrains, based on splitting information of the triangular prediction unit mode, whether the combined intra and inter prediction mode is executed and an execution manner.

Further, one of the following methods is included:

Method 1: When the current coding block/CU meets a separate constraint condition of the triangular prediction unit mode identifier merge_triangle_flag and transmission of merge_triangle_flag is allowed, merge_triangle_flag is parsed. When merge_triangle_flag is 1, merge_triangle_idx is parsed, and a splitting direction TriangleDir of a triangular prediction unit mode is obtained from a lookup table based on merge_triangle_idx. When TriangleDir indicates that a triangular prediction unit is split along a diagonal, the combined intra and inter prediction mode identifier mh_intra_flag is not transmitted, and a combined intra and inter prediction mode is not used. When TriangleDir indicates that a triangular prediction unit is split along an inverse diagonal, mh_intra_flag is parsed when the current coding block/CU meets a separate constraint condition of the combined intra and inter prediction mode identifier mh_intra_flag and transmission of mh_intra_flag is allowed. When mh_intra_flag indicates that the combined intra and inter prediction mode is executed, a bitstream is parsed to obtain an intra encoding mode-related syntax. The intra encoding mode-related syntax may include a most probable mode identifier mh_intra_luma_mpm_flag and a most probable mode index mh_intra_luma_mpm_idx. Alternatively, a fixed mode such as a planar mode may be directly used without transmitting any index. It should be noted that an intra encoding mode may be extracted based on mh_intra_luma_mpm_flag and mh_intra_luma_mpm_idx.

Method 2: When the current coding block/CU meets a separate constraint condition of the triangular prediction unit mode identifier merge_triangle_flag and transmission of merge_triangle_flag is allowed, merge_triangle_flag is parsed. When merge_triangle_flag is 1, merge_triangle_idx is parsed to obtain a splitting direction TriangleDir of a triangular prediction unit mode. When the current coding block/CU meets a separate constraint condition of the combined intra and inter prediction mode identifier mh_intra_flag and transmission of mh_intra_flag is allowed, mh_intra_flag is parsed. When mh_intra_flag is 1, an intra encoding mode-related index is parsed, and an intra prediction mode is selected from an intra candidate mode list (intra candidate list) based on the intra encoding mode-related index. When TriangleDir indicates that a triangular prediction unit is split along a diagonal, the intra candidate mode list (intra candidate list) includes only horizontal and vertical prediction modes. When TriangleDir indicates that a triangular prediction unit is split along an inverse diagonal, construction of the intra candidate mode list (intra candidate list) is not modified.

It should be noted that partitioning information and motion information of the triangular prediction unit mode may be obtained from a lookup table based on merge_triangle_idx. In addition, each element in the lookup table may include partitioning information and a unidirectional motion information candidate list index of the triangular prediction unit mode.

It should be noted that a location of merge_triangle_idx in the bitstream is not specified in this embodiment of the present disclosure, provided that merge_triangle_idx is parsed after merge_triangle_flag.

It should be noted that a location of the intra encoding mode-related index in the bitstream is not specified in this embodiment of the present disclosure, provided that the intra encoding mode-related index is parsed after mh_intra_flag.

It should be noted that, in this embodiment of the present disclosure, only a method for jointly using the triangular prediction unit mode identifier merge_triangle_flag and the combined intra and inter prediction mode identifier mh_intra_flag is used. A parsing method for the triangular prediction unit mode identifier merge_triangle_flag or the combined intra and inter prediction mode identifier mh_intra_flag is not limited. For example, the constraint may be as follows: The combined intra and inter prediction mode identifier mh_intra_flag is parsed only when a width and a height of the coding block/CU are greater than or equal to 8 and less than 128; otherwise, mh_intra_flag is not parsed, and mh_intra_flag is set to not executing the combined intra and inter prediction mode. The triangular prediction unit mode identifier merge_triangle_flag is parsed only when the width plus the height of the coding block/CU is greater than 12; otherwise, merge_triangle_flag is not parsed, and merge_triangle_flag is set to executing the triangular prediction unit mode.

For other steps, refer to the description in Embodiment 3. Details are not described again.

Embodiment 5

Embodiment 5 relates to an inter encoding and filtering method, and decoding processing on a picture block by using the method. A main difference from Embodiment 3 lies in steps 1301 and 1302.

Step 1301: Parse an inter prediction mode of a current block to obtain a triangular prediction unit mode identifier, a combined intra and inter prediction mode identifier, and a mode-related syntax element.

In a triangular prediction unit mode, a coding block is split into two triangular coding blocks along a diagonal. Diagonal splitting may be diagonal splitting or inverse diagonal splitting, as shown in FIG. 3. Splitting from a top-left corner to a bottom-right corner of the current coding block is diagonal splitting, and splitting from a top-right corner to a bottom-left corner of the current coding block is back diagonal splitting.

If the current coding block/CU is in a merge mode, a joint parsing method for the triangular prediction unit mode identifier merge_triangle_flag and the combined intra and inter prediction mode identifier mh_intra_flag mainly constrains, based on the combined intra and inter prediction mode, whether the triangular prediction unit mode is executed and splitting information.

Details are as follows:

Method 1: When the current coding block/CU meets a separate constraint condition of the combined intra and inter prediction mode identifier mh_intra_flag and transmission of mh_intra_flag is allowed, mh_intra_flag is parsed. When mh_intra_flag is 1, intra encoding mode-related syntax elements (such as mh_intra_luma_mpm_flag and mh_intra_luma_mpm_idx) are parsed, and an intra prediction mode is selected from an intra candidate mode list (intra candidate list) based on mh_intra_luma_mpm_flag and mh_intra_luma_mpm_idx. Deletion is performed on a lookup table according to a preset policy. The deletion policy is as follows: When the intra prediction mode is a DC or planar mode, merge_triangle_flag is not parsed, and the triangular prediction unit mode is not executed. When the intra prediction mode is a horizontal or vertical mode, and the current coding block/CU meets a separate constraint condition of the triangular prediction unit mode identifier merge_triangle_flag and transmission of merge_triangle_flag is allowed, merge_triangle_flag is parsed. When merge_triangle_flag is 1, merge_triangle_idx is parsed, and a splitting direction TriangleDir of the triangular prediction unit mode is obtained based on the lookup table.

Method 2: When the current coding block/CU meets a separate constraint condition of the combined intra and inter prediction mode identifier mh_intra_flag and transmission of mh_intra_flag is allowed, mh_intra_flag is parsed. When mh_intra_flag is 1, intra encoding mode-related syntax elements (such as mh_intra_luma_mpm_flag and mh_intra_luma_mpm_idx) are parsed, and an intra prediction mode is selected from an intra candidate mode list (intra candidate list) based on mh_intra_luma_mpm_flag and mh_intra_luma_mpm_idx. When the current coding block/CU meets a separate constraint condition of the triangular prediction unit mode identifier merge_triangle_flag and transmission of merge_triangle_flag is allowed, merge_triangle_flag is parsed. When merge_triangle_flag is 1, merge_triangle_idx is parsed, and a splitting direction TriangleDir of the triangular prediction unit mode is obtained based on a lookup table. Deletion may be performed on the lookup table according to a preset policy. The deletion policy is as follows: When the intra prediction mode is a DC or planar mode, the lookup table does not include elements obtained through splitting along a diagonal. When the intra prediction mode is a horizontal or vertical mode, the lookup table may not be modified.

Step 1302: Obtain an inter prediction block based on the triangular prediction unit mode identifier merge_triangle_flag and partitioning information and motion information of the triangular prediction unit mode that are obtained based on the triangular prediction unit mode index merge_triangle_idx.

Step 2.1: Obtain the motion information.

If the current block is in a merge/skip mode and merge_triangle_flag is 0, a merge motion information candidate list is generated. Then, motion information of the current block is determined based on a merge index carried in the bitstream. A method in HEVC or VTM may be used, or another method for generating a motion vector predictor candidate list may be used. This is not limited in this embodiment of the present disclosure.

If the current block is in a merge/skip mode and merge_triangle_flag is 1, a unidirectional motion information candidate list (uni-prediction candidate list) is generated, and motion information is determined from the unidirectional motion information candidate list based on the partitioning information and the unidirectional motion information candidate list index of the triangular prediction unit mode that are determined from the lookup table by using merge_triangle_idx.

The lookup table is a lookup table that is constructed in an existing manner and on which deletion is performed according to a preset policy. The deletion policy is as follows: When the intra prediction mode is a DC or planar mode, the lookup table does not include elements obtained through splitting along a diagonal. When the intra prediction mode is a horizontal or vertical mode, the lookup table is constructed in an existing manner.

For other steps, refer to the description in Embodiment 3. Details are not described again.

Embodiments 1 to 5 of the present disclosure can reduce encoding complexity and improve encoding efficiency.

Figure 11:
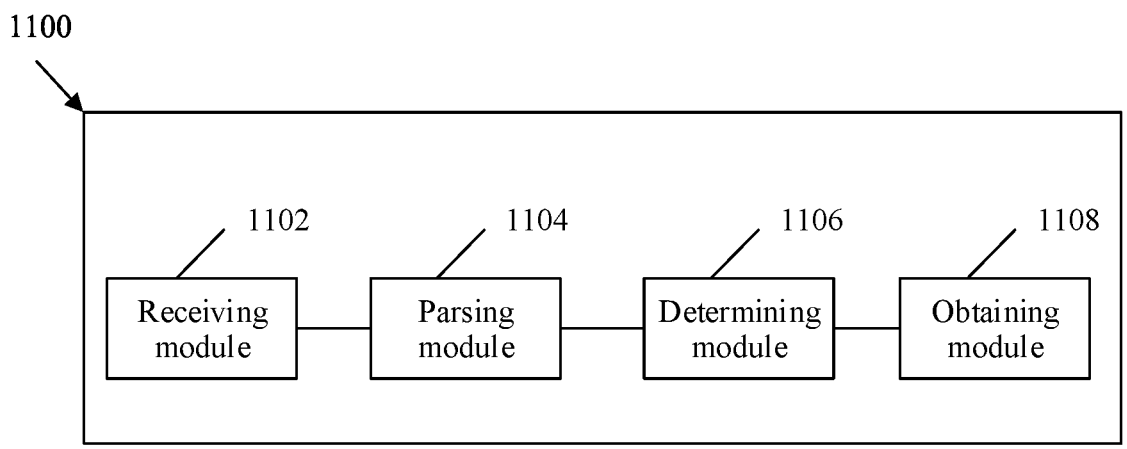
FIG. 11 is a schematic structural diagram of an apparatus according to an embodiment of the present disclosure.

FIG. 11 is a schematic structural diagram of an apparatus 1100 according to an embodiment of the present disclosure. The apparatus 1100 includes a receiving module 1102, a parsing module 1104, a determining module 1106, and an obtaining module 1108. In some embodiments, the parsing module 1104, the determining module 1106, and the obtaining module 1108 may run in the foregoing processor, for example, the processor 430 in FIG. 4 or the processor 502 in FIG. 5. In some other embodiments, related functions of the parsing module 1104, the determining module 1106, and the obtaining module 1108 may be implemented in the system or apparatus described in the embodiments of FIG. 1A to FIG. 3.

A first apparatus embodiment is as follows:

The receiving module 1102 is configured to receive a bitstream.

The parsing module 1104 is configured to parse the bitstream to obtain a prediction mode of a current block.

The determining module 1106 is configured to: when the prediction mode of the current block is not a combined intra and inter prediction mode, select an execution manner of a triangular prediction unit mode according to a preset policy, and determine motion information of the current block according to the execution manner of the triangular prediction unit mode.

The obtaining module 1108 is configured to perform a motion compensation process based on the motion information, to obtain a prediction picture of the current block.

The determining module is configured to: when the combined intra and inter prediction mode is not used, execute the triangular prediction unit mode according to the preset policy. Alternatively, the determining module is configured to: when the combined intra and inter prediction mode is not used, parse a triangular prediction unit mode identifier and execute the triangular prediction unit mode according to the preset policy.

A second apparatus embodiment is as follows:

The receiving module 1102 is configured to receive a bitstream.

The parsing module 1104 is configured to parse the bitstream to obtain a triangular prediction unit mode of a current block.

The determining module 1106 is configured to: when the triangular prediction unit mode is used for the current block, select an execution manner of a combined intra and inter prediction mode according to a first preset policy.

The obtaining module 1108 is configured to: obtain motion information of the current block according to the triangular prediction unit mode, to obtain an inter prediction sample; and obtain a prediction picture of the current block according to the execution manner of the combined intra and inter prediction mode and the inter prediction sample.

In a third apparatus embodiment, the receiving module 1102 and the parsing module 1104 are optional.

The determining module 1106 is configured to: when a prediction mode of a current block is not a combined intra and inter prediction mode, determine that a triangular prediction unit mode is executed; and determine motion information of the current block according to the triangular prediction unit mode.

The obtaining module 1108 is configured to perform a motion compensation process based on the motion information, to obtain a prediction picture of the current block.

The determining module 1106 is further configured to: when it is determined, according to a preset policy, that the triangular prediction unit mode is executed, obtain a splitting direction (TriangleDir) of the triangular prediction unit mode; and when the prediction mode of the current block is the combined intra and inter prediction mode, determine that the triangular prediction unit mode is not executed for the current block.

The obtaining module 1108 is configured to obtain an identifier mh_intra_flag, where the identifier mh_intra_flag is used to indicate whether the prediction mode of the current block is the combined intra and inter prediction mode.

The receiving module 1102, the parsing module 1104, the determining module 1106, and the obtaining module 1108 may be configured to implement related method steps shown in Embodiments 1 to 5. For brevity of the specification, details are not described herein again.

In the foregoing embodiments, the description of each embodiment has respective focuses. For a part that is not described in detail in an embodiment, refer to related descriptions in other embodiments.

In the several embodiments provided in this application, it should be understood that the disclosed apparatus may be implemented in other manners. For example, the described apparatus embodiments are merely examples. For example, division into the units is merely logical function division. There may be another division manner in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located at one location, or may be distributed on a plurality of network units. Some or all of the units may be selected based on actual requirements to achieve the objectives of the solutions of the embodiments.

In addition, function units in the embodiments of the present disclosure may be integrated into one processing unit, or each of the units may exist alone physically, or two or more units may be integrated into one unit. The integrated unit may be implemented in a form of hardware, or may be implemented in a form of a software function unit.

The following describes application of the encoding method and the decoding method shown in the foregoing embodiments, and a system using the encoding method and the decoding method.

Figure 12:
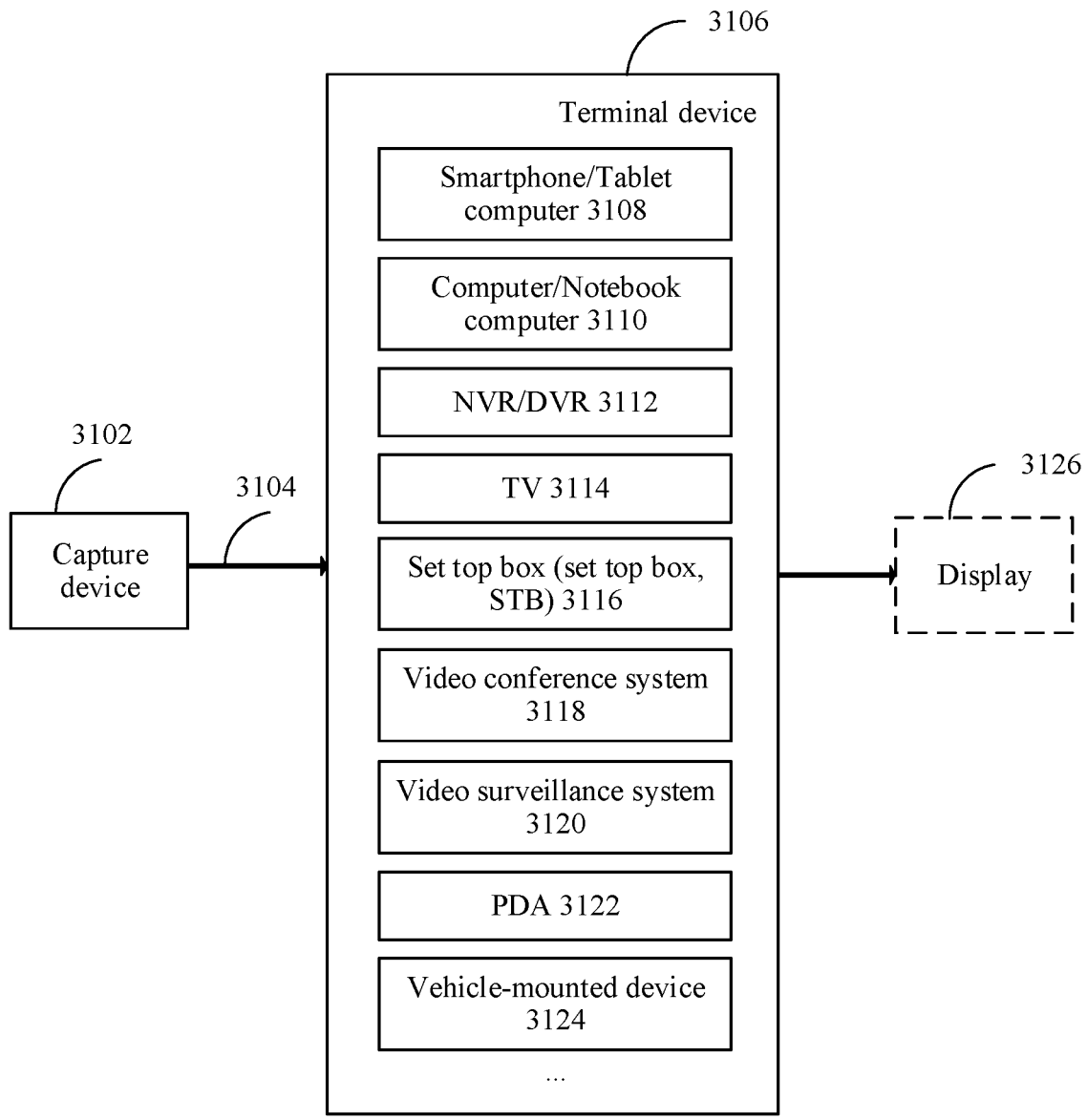
FIG. 12 is a block diagram illustrating an example structure of a content supply system 3100 that implements a content delivery service.

FIG. 12 is a block diagram illustrating a content supply system 3100 configured to implement a content delivery service. The content supply system 3100 includes a capture device 3102, a terminal device 3106, and optionally a display 3126. The capture device 3102 communicates with the terminal device 3106 through a communication link 3104. The communication link may include the communications channel 13 described above. The communication link 3104 includes but is not limited to Wi-Fi, the Ethernet, a wired connection, a wireless (3G/4G/5G) connection, a universal serial bus (USB), or any type of combination thereof.

The capture device 3102 generates data, and may encode the data according to the encoding method shown in the foregoing embodiments. Alternatively, the capture device 3102 may distribute the data to a streaming server (not shown in the figure), and the server encodes the data and transmits the encoded data to the terminal device 3106. The capture device 3102 includes but is not limited to a camera, a smartphone or a tablet computer, a computer or a notebook computer, a video conference system, a personal digital assistant (PDA), a vehicle-mounted device, or any combination thereof. For example, the capture device 3102 may include the source device 12 described above. When the data includes a video, a video encoder 20 included in the capture device 3102 may actually encode the video. When the data includes audio (that is, voice), an audio encoder included in the capture device 3102 may actually encode the audio. In some actual scenarios, the capture device 3102 distributes encoded video data and encoded audio data by multiplexing the encoded video data and the encoded audio data. In another actual scenario, for example, in a video conference system, the encoded audio data and the encoded video data are not multiplexed. The capture device 3102 separately distributes the encoded audio data and the encoded video data to the terminal device 3106.

In the content supply system 3100, the terminal device 3106 receives and reproduces the encoded data. The terminal device 3106 may be a device with data receiving and recovery capabilities, for example, a smartphone or tablet computer 3108, a computer or notebook computer 3110, a network video recorder (NVR)/digital video recorder (DVR) 3112, a TV 3114, a set top box (STB) 3116, a video conference system 3118, a video surveillance system 3120, a PDA 3122, a vehicle-mounted device 3124, or any combination of the foregoing devices that can decode the encoded data. For example, the terminal device 3106 may include the destination device 14 described above. When the encoded data includes a video, a video decoder 30 included in the terminal device is prioritized to perform video decoding. When the encoded data includes audio, an audio decoder included in the terminal device is prioritized to perform audio decoding.

For a terminal device having a display, for example, a smartphone or tablet computer 3108, a computer or notebook computer 3110, a NVR/DVR 3112, a TV 3114, a PDA 3122, or a vehicle-mounted device 3124, the terminal device may feed decoded data to the display of the terminal device. For a terminal device without a display, for example, an STB 3116, a video conference system 3118, or a video surveillance system 3120, an external display 3126 is connected to the terminal device to receive and display decoded data.

When each device in the system performs encoding or decoding, the picture encoding device or the picture decoding device shown in the foregoing embodiments may be used.

Figure 13:
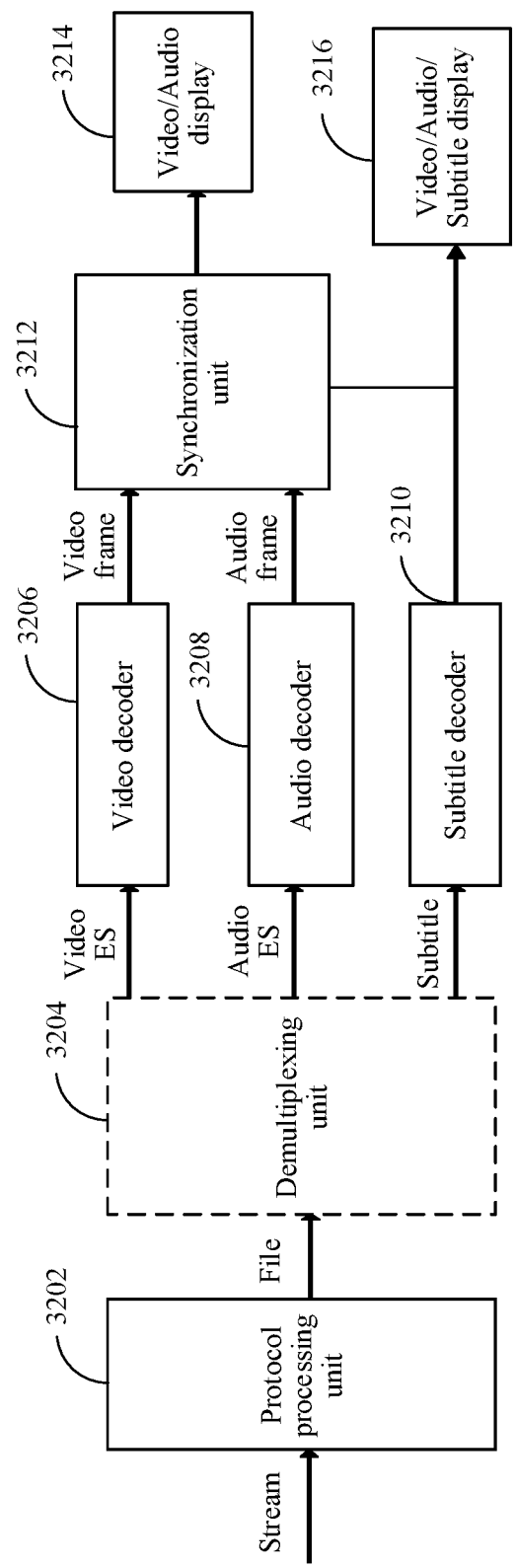
FIG. 13 is a block diagram of an example structure of a terminal device.

FIG. 13 is a diagram of an example structure of the terminal device 3106. After the terminal device 3106 receives a stream from the capture device 3102, a protocol processing unit 3202 analyzes a transport protocol of the stream. The protocol includes but is not limited to a Real-time Streaming Protocol (RTSP), a Hypertext Transfer Protocol (HTTP), an HTTP Live Stream (HLS) Protocol, Dynamic Adaptive Streaming over HTTP (DASH) MPEG-DASH, a Real-time Messaging Protocol (RTP), a Real-Time Messaging Protocol (RTMP), or any combination thereof.

After processing the stream, the protocol processing unit 3202 generates a stream file. The file is output to a demultiplexing unit 3204. The demultiplexing unit 3204 may split multiplexed data into encoded audio data and encoded video data. As described above, in another actual scenario, for example, in a video conference system, the encoded audio data and the encoded video data are not multiplexed. In this case, the encoded data is transmitted to a video decoder 3206 and an audio decoder 3208 without being transmitted through the demultiplexing unit 3204.

Demultiplexing is performed to generate a video elementary stream (ES), an audio ES, and optional subtitles. The video decoder 3206 includes the video decoder 30 described in the foregoing embodiments, decodes the video ES according to the decoding method shown in the foregoing embodiments to generate a video frame, and feeds such data to a synchronization unit 3212. The audio decoder 3208 decodes the audio ES to generate an audio frame, and feeds such data to the synchronization unit 3212. Alternatively, the video frame may be stored in a buffer (not shown in FIG. Y) before the video frame is fed to the synchronizing unit 3212. Similarly, the audio frame may be stored in the buffer (not shown in FIG. Y) before the audio frame is fed to the synchronizing unit 3212.

The synchronization unit 3212 synchronizes the video frame and the audio frame, and provides a video/audio for a video/audio display 3214. For example, the synchronization unit 3212 synchronizes presentation of video information and audio information. Information may be encoded syntactically by using a timestamp related to presentation of encoded audio and visual data and a timestamp related to transmission of a data stream.

If subtitles are included in the stream, a subtitle decoder 3210 decodes the subtitles to synchronize the subtitles with the video frame and the audio frame, and provides the video/audio/subtitles for a video/audio/subtitle display 3216.

The present disclosure is not limited to the foregoing system, and the picture encoding device or the picture decoding device in the foregoing embodiments may be combined into another system, for example, an automotive system.

It should be understood that disclosed content in combination with a described method may also hold true for a corresponding device or system configured to perform the method and vice versa. For example, if one or more specific method steps are described, a corresponding device may include one or more units such as function units, to perform the described one or more method steps (for example, one unit performing the one or more steps, or a plurality of units each performing one or more of the plurality of steps), even if such one or more units are not explicitly described or illustrated in the accompanying drawings. In addition, for example, if a specific apparatus is described based on one or more units such as function units, a corresponding method may include one step used to perform functionality of the one or more units (for example, one step used to perform the functionality of the one or more units, or a plurality of steps each used to perform functionality of one or more of a plurality of units), even if such one or more steps are not explicitly described or illustrated in the accompanying drawings. Further, it should be understood that features of the various example embodiments and/or aspects described in this specification may be combined with each other, unless noted otherwise.

In one or more examples, the described functions may be implemented by hardware, software, firmware, or any combination thereof. If implemented by software, the functions may be stored in or transmitted over a computer-readable medium as one or more instructions or code and executed by a hardware-based processing unit. The computer-readable medium may include a computer-readable storage medium, which corresponds to a tangible medium such as a data storage medium or a communications medium. For example, the communications medium includes, according to a communications protocol, any medium that facilitates transmission of a computer program from one place to another. In this manner, the computer-readable medium may generally correspond to: (1) a non-transitory tangible computer-readable storage medium, or (2) a communications medium such as a signal or a carrier. The data storage medium may be any usable medium that can be accessed by one or more computers or one or more processors to retrieve instructions, code, and/or data structures for implementing the technologies described in the present disclosure. A computer program product may include a computer-readable medium.

By way of example but not limitation, such computer-readable storage medium may include a RAM, a ROM, an electrically erasable programmable ROM (EEPROM), a compact disc (CD) ROM (CD-ROM) or another optical disk memory, a magnetic disk memory or another magnetic storage device, a flash memory, or any other medium that can be used to store desired program code in a form of an instruction or a data structure and that can be accessed by a computer. In addition, any connection may be appropriately referred to as a computer-readable medium. For example, if instructions are transmitted from a web site, a server, or another remote source by using a coaxial cable, an optical fiber, a twisted pair, a digital subscriber line (DSL), or wireless technologies such as infrared, radio, and microwave, the coaxial cable, the optical fiber, the twisted pair, the DSL, or the wireless technologies such as infrared, radio, and microwave are included in the definition of medium. However, it should be understood that the computer-readable storage medium and the data storage medium do not include connections, carriers, signals, or other transitory media, but actually mean non-transitory tangible storage media. As used in this specification, a disk and a disc include a CD, a laser disc, an optical disc, a DVD, a floppy disk, and a BLU-RAY disc. The disk usually reproduces data magnetically, but the disc reproduces data optically by using a laser. A combination of the foregoing items should also be included in a scope of the computer-readable medium.

The instructions may be executed by one or more processors. The one or more processors are, for example, one or more digital signal processors (DSPs), general-purpose microprocessors, ASIC, field programmable logic arrays (FPGAs), or other equivalent integrated or discrete logic circuits. Therefore, the term "processor" used in this specification may be any of the foregoing structures or any other structure suitable for implementing the technologies described in this specification. In addition, in some aspects, the functionality described in this specification may be provided within dedicated hardware and/or software modules configured for encoding and decoding, or incorporated in a combined codec. In addition, the technologies may be all implemented in one or more circuits or logic elements.

The technologies of this disclosure may be implemented in a wide variety of devices or apparatuses, including a wireless handset, an integrated circuit (IC) or a set of ICs (for example, a chip set). Various components, modules, or units are described in this disclosure to emphasize functional aspects of devices configured to perform the disclosed technologies, but are not necessarily implemented by different hardware units. As described above, various units may be combined into a codec hardware unit in combination with suitable software and/or firmware, or be provided by a set of interoperative hardware units. The hardware units include the one or more processors described above.

What is claimed is:

1. A method, comprising:
    encoding an identifier into a bitstream, wherein the identifier indicates whether a combined intra and inter prediction mode is applied for a current block, wherein an intra prediction mode in the combined intra and inter prediction mode is a planar mode; and
    determining, when the identifier indicates that the combined intra and inter prediction mode is applied for the current block, that a geometric partitioning based prediction mode is not used to obtain prediction samples of the current block, wherein the geometric partitioning based prediction mode comprises a triangular prediction unit mode.

2. The method of claim 1, further comprising:
    obtaining inter prediction samples of the current block according to an inter prediction mode;
    obtaining intra prediction samples of the current block according to the intra prediction mode; and
    combining the inter prediction samples and the intra prediction samples to obtain combined prediction samples of the current block.

3. The method of claim 1, further comprising encoding a merge index into the bitstream, wherein the merge index is for determining motion information of the current block, and wherein the motion information is for obtaining inter prediction samples of the current block.

4. The method of claim 1, further comprising determining, when a constraint condition is met, that the geometric partitioning based prediction mode is used to obtain the prediction samples of the current block, wherein the constraint condition comprises the identifier, and wherein the identifier indicates the combined intra and inter prediction mode is not applied for the current block.

5. The method of claim 4, further comprising:
    determining motion information of the current block according to the geometric partitioning based prediction mode; and
    performing a motion compensation process based on the motion information to obtain the prediction samples of the current block.

6. The method of claim 4, further comprising encoding a geometric partitioning index into the bitstream, wherein a splitting direction of the geometric partitioning based prediction mode is based on the geometric partitioning index.

7. An apparatus comprising:
    a memory configured to store instructions; and
    a processor coupled to the memory, wherein the instructions cause the processor to be configured to:
        encode an identifier into a bitstream, wherein the identifier indicating whether a combined intra and inter prediction mode is applied for a current block, wherein an intra prediction mode in the combined intra and inter prediction mode is a planar mode; and
        determine, when the identifier indicates that the combined intra and inter prediction mode is applied for the current block, that a geometric partitioning based motion compensation is not used to obtain prediction samples of the current block, wherein the geometric partitioning based prediction mode comprises a triangular prediction unit mode.

8. The apparatus of claim 7, wherein the instructions further cause the processor to be configured to:
- obtain inter prediction samples of the current block according to an inter prediction mode;
- obtain intra prediction samples of the current block according to the intra prediction mode; and
- combine the inter prediction samples and the intra prediction samples to obtain combined prediction samples of the current block.

9. The apparatus of claim 7, wherein the instructions further cause the processor to be configured to encode a merge index into the bitstream, wherein the merge index is used to determine motion information of the current block, and wherein the motion information is used to obtain inter prediction samples of the current block.

10. The apparatus of claim 7, wherein the instructions further cause the processor to be configured to determine, when a constraint condition is met, that the geometric partitioning based prediction mode is used to obtain the prediction samples of the current block, wherein the constraint condition comprises the identifier indicating that the combined intra and inter prediction mode is not applied for the current block.

11. The apparatus of claim 10, wherein the instructions further cause the processor to be configured to:
- determine motion information of the current block according to the geometric partitioning based prediction mode; and
- perform a motion compensation process based on the motion information to obtain the prediction samples of the current block.

12. The apparatus of claim 10, wherein the instructions further cause the processor to be configured to encode a geometric partitioning index into the bitstream, wherein a splitting direction of the geometric partitioning based prediction mode is based on the geometric partitioning index.

13. A non-transitory computer-readable storage medium storing program code comprising instructions, which when executed using a processor of an apparatus, cause the apparatus to:
- encode an identifier into a bitstream, wherein the identifier indicating whether a combined intra and inter prediction mode is applied for a current block, wherein an intra prediction mode in the combined intra and inter prediction mode is a planar mode; and
- determine, when the identifier indicates that the combined intra and inter prediction mode is applied for the current block, that a geometric partitioning based motion compensation is not used to obtain prediction samples of the current block, wherein the geometric partitioning based prediction mode comprises a triangular prediction unit mode.

14. The non-transitory computer-readable storage medium of claim 13, wherein the instructions, when executed using the processor, further cause the apparatus to:
- obtain inter prediction samples of the current block according to an inter prediction mode;
- obtain intra prediction samples of the current block according to the intra prediction mode; and
- combine the inter prediction samples and the intra prediction samples to obtain combined prediction samples of the current block.

15. The non-transitory computer-readable storage medium of claim 13, wherein the instructions, when executed using the processor, further cause the apparatus to encode a merge index into the bitstream, wherein the merge index is used to determine motion information of the current block, and wherein the motion information is used to obtain inter prediction samples of the current block.

16. The non-transitory computer-readable storage medium of claim 13,
wherein the instructions, when executed using the processor, further cause the apparatus to determine, when a constraint condition is met, that the geometric partitioning based motion compensation is used to obtain the prediction samples of the current block, wherein the constraint condition comprises the identifier indicating that the combined intra and inter prediction mode is not applied for the current block.

17. The non-transitory computer-readable storage medium of claim 16, wherein the instructions, when executed using the processor, further cause the apparatus to:
- determine motion information of the current block according to the geometric partitioning based motion compensation; and
- perform a motion compensation process based on the motion information to obtain the prediction samples of the current block.

18. The non-transitory computer-readable storage medium of claim 16, wherein the instructions, when executed using the processor, further cause the apparatus to encode a geometric partitioning index into the bitstream, and wherein a splitting direction of the geometric partitioning based prediction mode is based on the geometric partitioning index.

19. A non-transitory computer-readable medium storing a bitstream that is generated by an encoding method performed by a video encoding apparatus, wherein the bitstream comprises an identifier indicating whether a combined intra and inter prediction mode is applied for a current block, wherein an intra prediction mode in the combined intra and inter prediction mode is a planar mode, wherein when the identifier indicates that the combined intra and inter prediction mode is applied for the current block, a geometric partitioning based motion compensation is not used to obtain prediction samples of the current block, wherein the geometric partitioning based prediction mode comprises a triangular prediction unit mode, wherein when a constraint condition is met, the geometric partitioning based motion compensation is used to obtain the prediction samples of the current block, and wherein the constraint condition comprises the identifier indicating that the combined intra and inter prediction mode is not applied for the current block.

20. The non-transitory computer-readable medium of claim 19, wherein a merge index is encoded into the bitstream, and wherein the merge index is for determining motion information of the current block.

21. The non-transitory computer-readable medium of claim 20, wherein the motion information is for obtaining inter prediction samples of the current block.

* * * * *